US010010759B2

(12) United States Patent
Kramer et al.

(10) Patent No.: US 10,010,759 B2
(45) Date of Patent: *Jul. 3, 2018

(54) MODULAR ACTIVITY BOARD

(71) Applicant: MORF LLC, West Hollywood, CA (US)

(72) Inventors: Eitan Kramer, New York, NY (US); Frank Bleck, Santa Barbara, CA (US); Eric Michael Bergman, Playa Vista, CA (US)

(73) Assignee: MORF, LLC, West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,069

(22) Filed: Apr. 10, 2017

(65) Prior Publication Data
US 2017/0209745 A1 Jul. 27, 2017

Related U.S. Application Data

(63) Continuation of application No. 15/153,667, filed on May 12, 2016, now Pat. No. 9,616,294, which is a (Continued)

(51) Int. Cl.
*A63B 22/16* (2006.01)
*A63B 26/00* (2006.01)
(Continued)

(52) U.S. Cl.
CPC .............. *A63B 26/003* (2013.01); *A63B 5/00* (2013.01); *A63B 21/0442* (2013.01);
(Continued)

(58) Field of Classification Search
CPC ..... A63B 26/003; A63B 26/006; A63B 22/18; A63B 22/185; A63B 22/16
See application file for complete search history.

(56) References Cited

U.S. PATENT DOCUMENTS 3,604,726 A 9/1971 Tracy
3,716,229 A 2/1973 Van Der Cleyen et al.
(Continued)

FOREIGN PATENT DOCUMENTS

EP 2007486 B1 1/2011

OTHER PUBLICATIONS

Cool Board Balance Board. Web. Retrieved Oct. 29, 2015. 11 pages. «https://coolboard.co.uk/».
(Continued)

*Primary Examiner* — Loan H Thanh
*Assistant Examiner* — Rae Fischer
(74) *Attorney, Agent, or Firm* — Mintz Levin Cohn Ferris Glovsky and Popeo, P.C.

(57) ABSTRACT

An apparatus for receiving one or more activity attachments including a deck having one or more openings along a long axis of the deck and between the top surface and the bottom surface of the deck. Each of the one or more openings having a circular aperture for receiving an accessory of a set of accessories. Each accessory of the set of accessories providing an activity for a user of the activity. Each accessory having an attachment platform configured to attach the accessory to the board. The attachment platform having a locking mechanism to engaging with a complementary locking mechanism of the board.

14 Claims, 22 Drawing Sheets

Related U.S. Application Data continuation-in-part of application No. 14/710,141, filed on May 12, 2015, now Pat. No. 9,339,677, which is a continuation-in-part of application No. 14/067,914, filed on Oct. 30, 2013, now Pat. No. 9,364,716.

(60) Provisional application No. 61/720,140, filed on Oct. 30, 2012.

(51) Int. Cl.

| | | |
|---|---|---|
| *A63B 5/00* | (2006.01) | |
| *A63B 21/04* | (2006.01) | |
| *A63B 21/055* | (2006.01) | |
| *A63B 21/00* | (2006.01) | |
| *A63B 22/18* | (2006.01) | |
| *A63B 22/20* | (2006.01) | |
| *A63B 23/12* | (2006.01) | |
| *A63B 69/00* | (2006.01) | |
| *A63C 17/01* | (2006.01) | |
| *A63C 17/00* | (2006.01) | |
| *B62K 5/05* | (2013.01) | |

(52) U.S. Cl.
CPC ...... *A63B 21/0557* (2013.01); *A63B 21/4034* (2015.10); *A63B 21/4035* (2015.10); *A63B 21/4043* (2015.10); *A63B 22/18* (2013.01); *A63B 22/20* (2013.01); *A63B 23/1236* (2013.01); *A63B 69/0022* (2013.01); *A63C 17/0093* (2013.01); *A63C 17/011* (2013.01); *A63C 17/015* (2013.01); *A63C 17/016* (2013.01); *A63C 2203/06* (2013.01); *B62K 5/05* (2013.01)

(56) References Cited

U.S. PATENT DOCUMENTS

| | | |
|---|---|---|
| 4,073,356 A | 2/1978 | Schlicht |
| 4,893,809 A | 1/1990 | Blankenzee |
| 5,766,119 A | 6/1998 | Clark |
| 7,857,740 B2 | 12/2010 | Suaste |
| 8,267,845 B2 | 9/2012 | Taylor et al. |
| 9,339,677 B2 | 5/2016 | Kramer et al. |
| 9,364,716 B2 | 6/2016 | Kramer et al. |
| 9,616,294 B2 | 4/2017 | Kramer et al. |
| 2004/0087421 A1* | 5/2004 | Lin ............ A63B 21/0004 482/146 |
| 2010/0013194 A1 | 1/2010 | Booker |
| 2010/0171277 A1 | 7/2010 | Hwongbo |
| 2011/0136636 A1 | 6/2011 | Canton et al. |
| 2012/0252644 A1 | 10/2012 | Reade |
| 2012/0264579 A1 | 10/2012 | Klein et al. |
| 2013/0184131 A1 | 7/2013 | Doyle |
| 2014/0121082 A1 | 5/2014 | Kramer et al. |
| 2015/0238793 A1 | 8/2015 | Kramer et al. |

OTHER PUBLICATIONS

GOFIT Core Wobble Board. Web. Retrieved Oct. 29, 2015. 3 pages. «https://www.gofit.net/index.php/products/a—gofit-products/all-gofit-products-balance-sta . . . ».

HASBRO Pogo Balls Web. Retrieved Oct. 29, 2015. 3 pages. «http://www.ebay.com/itm/Space-Rock-N-Hopper-Logo-Pogo-Ball-Bounce-Hop-Brand-/3 . . . ».

Pp Plastic Balance Board. Web. Retrieved Oct. 29, 2015. 3 pages. «http://www.alibaba.com/product-detail/Plastic-Balance-board_586542666.html?spm=a27 . . . ».

REEBOK Trainpod. Web. Retrieved Oct. 29, 2015. 4 pages. «http://www.amazon.co.uk/Reebok-TrainPod/dp/B008UVIM10».

VS ATHLETICS Balance Disc Cushion. Web. Retrieved Oct. 29, 2015. 3 pages. «https://www.vsathletics.com/store/Balance-Disc-Cushion.html».

* cited by examiner

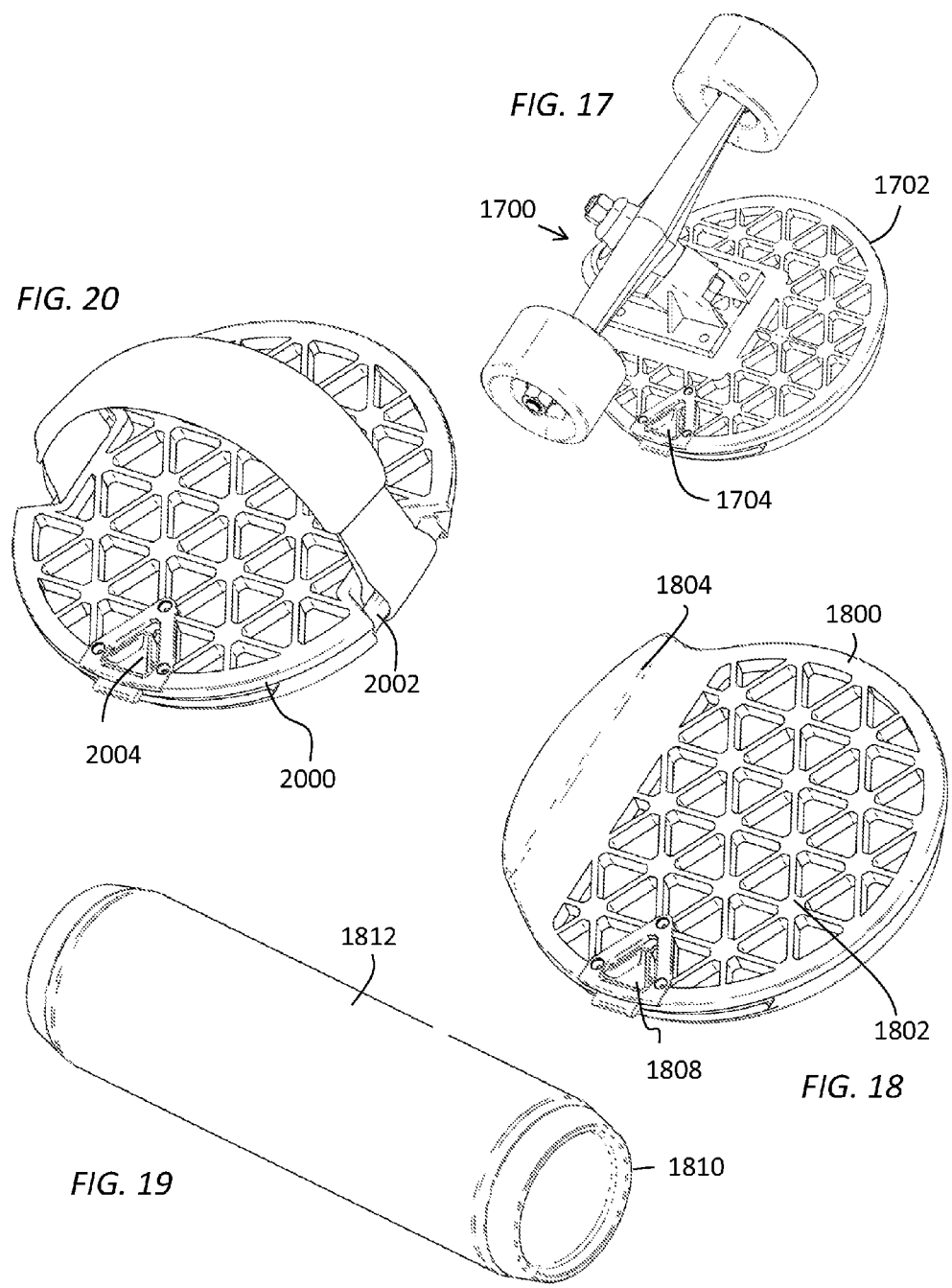

MODULAR ACTIVITY BOARD

CROSS REFERENCE TO RELATED APPLICATIONS

This application is a continuation of and claims priority under 35 U.S.C. § 120 to U.S. patent application Ser. No. 15/153,667 filed May 12, 2016 and titled "Modular Activity Board", which is a continuation-in-part application of U.S. patent application Ser. No. 14/710,141 filed on May 12, 2015 and titled "Modular Exercise Board", which is a continuation-in-part application of U.S. patent application Ser. No. 14/067,914 filed on Oct. 30, 2013 and titled "Portable Multipurpose Fitness Device", which claims the benefit of U.S. Provisional Patent Application No. 61/720,140 filed on Oct. 30, 2012 and titled "Portable Multipurpose Fitness Device", the disclosures of which are incorporated herein by reference in their entireties.

TECHNICAL FIELD

The presently disclosed subject matter relates to a modular fitness apparatus.

BACKGROUND

Traditional fitness equipment is generally limited to one exercise type or a select few exercise types. Consequently, it is typical that multiple separate pieces of fitness equipment are used in order to exercise different muscle groups. This causes individuals to acquire multiple pieces of fitness equipment or to join a gym to get access to the many different gym machines. Traditional fitness systems, therefore, are costly, take up a lot of space, and/or provide a degree of inconvenience in having to travel to a gym.

SUMMARY

One aspect of the present disclosure relates to a modular activity board. The modular activity board may be configurable for many different activities. The activity board may include multiple accessories for use with the modular activity board. The modular activity board may comprise a deck. The deck may include a top and a bottom surface. The deck may have a long axis and a short axis, with long axis being longer than the short axis. The deck of the modular activity module may comprise a pair of activity accessory receivers. The activity accessory receivers may be positioned laterally from the through passage on either end of the deck. Each of the activity accessory receivers may be configured for removably mounting an activity accessory. An activity accessory coupling mechanism may be disposed in the deck for receiving and coupling the activity accessories with the deck in the activity accessory receivers. The activity accessory coupling mechanism may be configured to facilitate locking of the activity accessories in a non-rotating position relative to the deck.

In one aspect a modular and reconfigurable activity system is described. The modular and reconfigurable activity system can include modular activity board formed of a deck having a top surface, a bottom surface, a first end portion, a second end portion, and opposing side rails. Each of the first and second end portions can be angled upward from the top surface of the deck. The deck can be defined by a longitudinal axis through the first end portion and the second end portion, and a latitudinal axis through an approximate center of the deck through the opposing side rails. The deck can further have a first activity accessory receiver proximate the first end portion and a second activity accessory receiver proximate the second end portion. Each of the first and second activity accessory receivers can be defined by a single circular aperture and having a first locking mechanism therewith.

The modular and reconfigurable activity system can include a set of activity accessories. Each activity accessory of the set of activity accessories can comprise an attachment platform that is sized and configured to mate within the single circular aperture. The attachment platform can further have a second locking mechanism therewith to cooperate with the first locking mechanism to releasably secure the attachment platform within the single circular aperture. Each activity accessory can further comprise an activity mechanism extending from a top and/or bottom of the attachment platform to enable an activity to be performed by a rider of the modular activity board when the activity accessory is secured to the deck.

The activity mechanism of the activity accessory can be one or more wheels on an axle mounted to the bottom of the attachment platform; a roll stopper mounted to the bottom of the attachment platform; a bounce ball mounted to the bottom of the attachment platform; or a scooter handle mounted to the top of the attachment platform, one or more wheels on an axle mounted to the bottom of the attachment platform, or the like In another aspect, a modular exercise board is described. The modular exercise board can include a deck. The deck may include a through passage at the intersection of the axes. The through passage may be configured for removably mounting a plurality of different center modules. The deck may include a center module coupling mechanism for receiving and coupling center modules with the deck in the through passage.

The center module coupling mechanism may be configured to lock the center module in a non-rotating position relative to the deck.

The activity accessory coupling mechanism(s) in the deck may include a thread portion for receiving a complimentary thread portion of said activity accessory. The activity accessory coupling mechanism(s) may further comprise a locking mechanism for locking the activity accessories in a non-rotating position relative to said deck. In some variations, the deck may further comprise a first portion of the locking mechanism and the activity accessories may further comprise a second portion of the locking mechanism configured to engage with the first potion.

The deck may comprise multiple first portions of the locking mechanism at either end of the deck. The multiple first portions of the locking mechanism may be configured to engage with the second portion of the locking mechanism on each the activity accessories to provide multiple locking positions for the activity accessories in the activity accessory receivers.

In some variations the activity accessories comprise an activity accessory locking mechanism configured to couple the activity accessories with the activity accessory receiving portions in the deck. The activity accessory locking mechanism may comprise a locking member. An actuator may be provided that is configured to actuate the locking member. The activity accessory locking mechanism may comprise a biasing member. The biasing member may be configured to provide a bias to cause the locking member to maintain engagement with said deck. The bias provided by the biasing member may include a force that is directed substantially parallel to the plane of the activity accessory causing the locking mechanism to be pushed into the periphery of the activity accessory receiver when the activity accessory is disposed in the activity accessory receiver of the deck. The deck may comprise a locking mechanism receiver configured to receive the locking mechanism of the activity accessory to facilitate securing the activity accessory in the activity accessory receiver. The actuator of the locking mechanism may be configured to overcome the bias provided by the biasing member to facilitate release of said locking member from said deck. The actuator of the locking mechanism may be configured to facilitate a user overcoming the bias provided by the biasing member.

The center module of a modular exercise board may be selected from a plurality of different types of center modules for performing different types of exercises. For example, the center module may be selected from the group consisting of a roller ball, a bounce ball, a flush deck plug, a halo destabilizer, an aggressive bounce ball, or other center modules. The selection of center modules may further comprise floor contacting bases configured to mount in said through passage and to contact a floor surface when said board is in use. In some variations, a first portion of the center module may extend below the deck. A second portion of the center module may be generally level with a top surface of the deck.

The exercise accessories may be selected from a plurality of different types of exercise accessories for performing different types of exercises. For example, the exercise accessory may be selected from the group consisting of a hand grip, a flat disc with a foot strap, a deck plug, a ring with attached resilient bands, a balance roller stopper, a skateboard truck, or other exercise accessory. The exercise accessories may be selected to complement the selected center module. In some use cases, the selection of the exercise accessory may be independent of the selection of the center module.

The exercise board may further comprise resilient bands attached to the deck for use by a user when standing on said deck.

In one variation, the exercise accessory receivers may be generally circular passages into which the exercise accessory is removably mounted. The passages may be formed on one side by a portion of a circle in the deck, and on the opposite side by a removable C shaped portion which completes a circular lateral receiver position passage when attached to the deck.

Another aspect of the present disclosure is directed to an apparatus for receiving one or more attachment modules. The attachment modules provide an exercise accessory to enable an exercise mode. The apparatus may comprise a deck having a top surface, a bottom surface, a proximal end, a distal end, and opposing side portions. The deck may further have a long axis from the proximal end to the distal end, and a short axis between the opposing side portions, the long axis being longer than the short axis.

The apparatus may comprise one or more attachment mechanisms associated with at least one of the top surface and/or the bottom surface of the deck. The one or more attachment mechanisms may have a coupling mechanism, where each of the one or more attachment mechanisms of the deck is configured to couple with the attachment mechanism of the one or more attachment modules. Each attachment module of the set of attachment modules may provide the exercise mode for use with the deck. The coupling mechanism of each of the one or more attachment mechanisms may be configured to couple the attachment module with the attachment mechanism after the attachment mechanism couples with the attachment module.

In some variations, the coupling mechanism of each of the one or more attachment mechanisms is configured to lock the attachment module in a non-rotating position with the attachment mechanism after the attachment mechanism couples with the attachment module.

In some variations, at least one of the one or more attachment mechanisms is a single through passage between the top surface and the bottom surface of the deck. The single through passage may be defined by an inner perimeter, and includes a thread along at least a portion of the inner perimeter. The locking mechanism may be associated with the through passage and may include a retractable pin to engage a corresponding notch in the attachment module. In other variations, the locking mechanism may be associated with the through passage and includes a notch for receiving a retractable pin in the attachment module.

The center module can be a generally resilient protuberance below the deck, and may or may not extend above the deck. The part of the center module which extends below the deck can be firm but resilient and provide a certain amount of bounce for springing motion when in contact with the floor below the device. One version of the center module is less springy and less bouncy, and provides a stable platform for exercises not involving rebound. The center module can also have rebound enhancing devices such as springs to cause greater rebound. The center module can include a mounting means such as a locking ring, which can be configured in various ways to removably lock the center module in place in the deck. The mounting means can be essentially a ring with extending arms which twist into a locking place by a quarter turn or quarter screw, into receiving slots or threads built into the deck. The center module can have portion that extends below the deck which can be rounded on the bottom or can be flat, or have a portion extending above the deck, with our without a hand grip. The locking means can be a bayonet type mount, in which tabs on the side of the locking ring fit into tabs in the deck, so that when the locking ring is rotated in one direction, the tabs lock into place in the deck. The center module can have a portion that protrudes above the deck surface and that portion can be a generally tubular section with a hand grip built into the end. It can also be generally flush with the top of the deck and not extend above the top of the deck.

One example of an exercise accessory is a ring which has a hand grip in its center. The hand grips would be spaced at an appropriate distance from each other to provide a user a position to do pushups with the hand grips turned to various positions in order to exercise different muscle groups of the arms and shoulders. The exercise accessory in the form of a hand grip can also be locked solidly in place into a preferred embodiment such as perpendicular to the long axis of the deck. Other examples of exercise accessories can be a skate board truck with wheels which mounts in place in the lateral receiving positions, which makes the deck of the exercise board into a skate board. Another example of a lateral exercise accessory is one which is round and disc like and locks into place, flush with the deck, and has straps which engage the user's feet to hold them in place.

In one configuration of the disclosed technology, in one version of the deck, the end pieces of the deck are removable. In this version with the removable deck tips, with the deck tips removed the exercise accessory is exposed and is able to slide out of its engagement with the deck. When the deck tips are installed around the lateral exercise accessory, the accessory is locked in place in the deck and ready for use. The deck can also include resistance band attachments which slip into prepared slots or attachment points in the deck. The band anchors are thus locked in place in the deck tips, and a cable may be attached to a fixed anchor position in order to create resistance for the user when maneuvering the base station. The deck may also include hand grip areas which are on the short axis of the deck, and adjacent to the center module. A version of the deck which has these supplemental hand grips could thus have four or five hand grip positions. The two supplemental hand grips, the two lateral exercise accessories in the form of hand grips, and the top part of the center module in the form of a hand grip.

The center module can be of a resilient rubber like material which protrudes below the deck as well as above the deck. The above the deck portion can have a hollow top with a hand grip region in the top. The center module can also be formed of a collar portion which locks in place an omni-directional ball, so that the ball may rotate like a ball at the end of a ball point pen, while supporting the deck. The above deck portion of this type of center module can be of a hard plastic and have a hand grip. Another version of the center module is one in which the portion below the deck is a flat bottom disc like shape, with little or no portion protruding above the deck. There are attachment options and devices for the center module as well as the lateral mounting positions. These optional devices can make the deck into a balance board, so that the user may balance over a cylinder which is free to rotate.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 17 is an illustration of an attachment for use with an exercise device having one or more features consistent with the disclosed subject matter;

FIG. 18 is an illustration of an attachment for use with an exercise device having one or more features consistent with the disclosed subject matter;

FIG. 19 is a roller for use with the attachment illustrated in FIG. 18; and,

FIG. 20 is an illustration of an attachment for use with an exercise device having one or more features consistent with the disclosed subject matter.

Like reference symbols in the various drawings indicate like elements.

DETAILED DESCRIPTION

Figure 1:
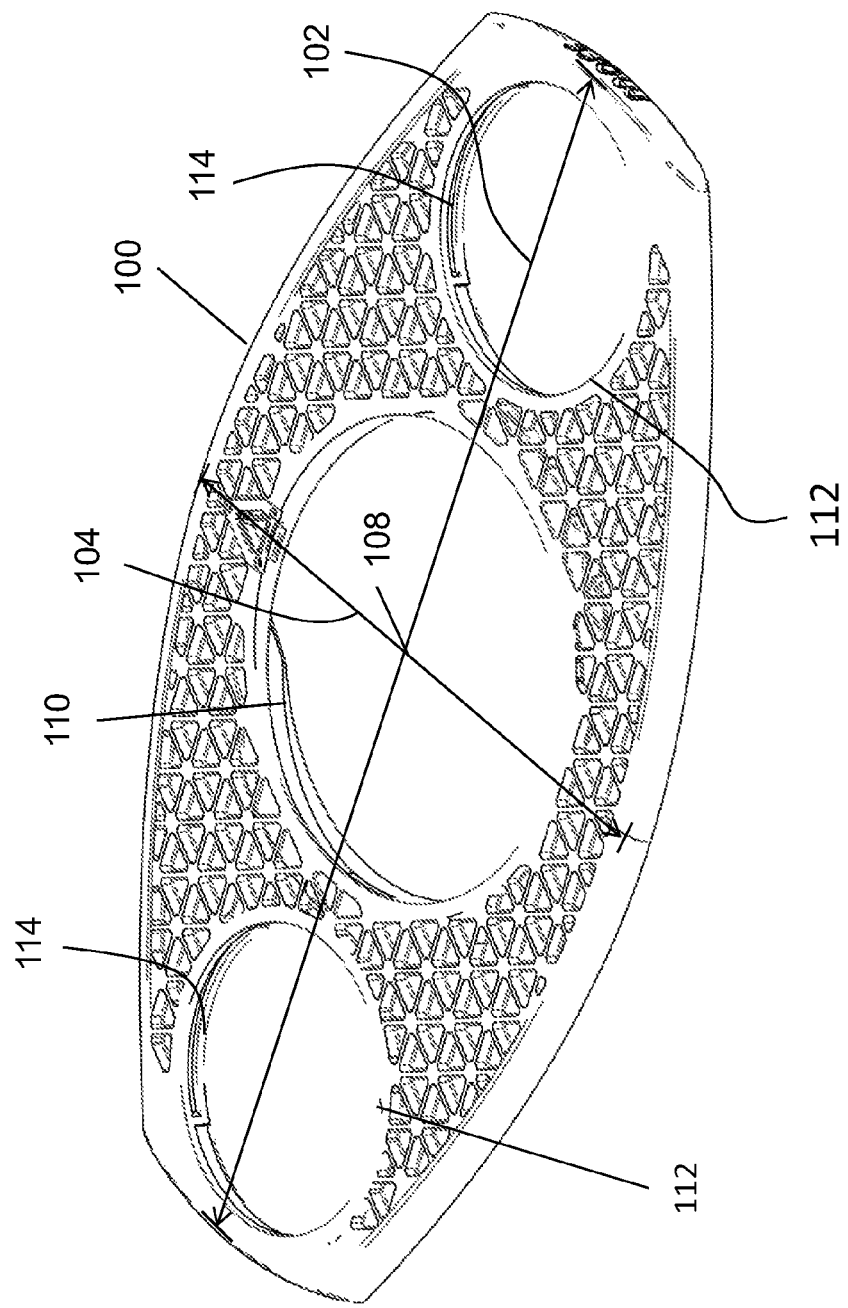
FIG. 1 is a perspective view of one embodiment of the deck of the disclosed device having one or more features consistent with the presently disclosed subject matter.

This document describes a modular exercise device configured to facilitate a user in the performance of different exercises using the same piece of equipment.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Referring to FIG. 1, illustrated is an exemplary embodiment of a deck 100 for a modular exercise board. The deck may have a long axis 102 and a short axis 104. A through passage 106 may be defined at the intersection 108 of the long axis 102 and the short axis 104. The through passage 106 may be configured for removably mounting a plurality of different center modules. The deck 106 may comprise a center module coupling mechanism 110. The center module coupling mechanism 110 may be configure to receive and couple a center module with the deck 100 in the through passage 106.

The deck 100 may comprise a pair of exercise accessory receivers 112. The exercise accessory receivers 112 may be positioned laterally from the through passage 106. The exercise accessory receivers 112 may be positioned on either end of the deck 100. The exercise accessory receivers 112 may be configured for removably mounting an exercise accessory. An exercise accessory coupling mechanism 114 may be disposed in the deck 100. The exercise accessory coupling mechanism 114 may be configured for receiving and coupling exercise accessories.

Figure 2:
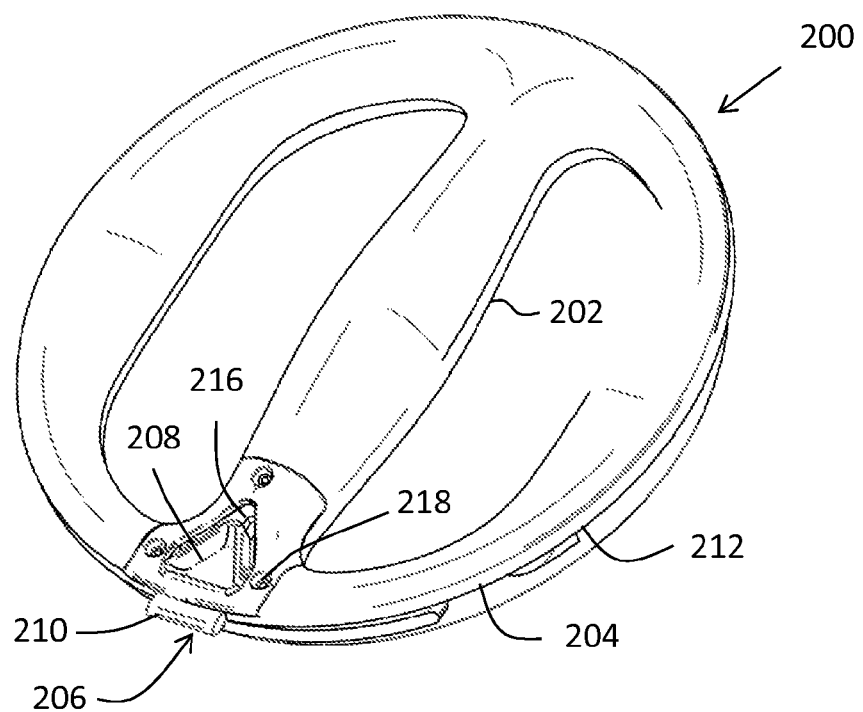
FIG. 2 depicts an alternative implementation of an attachment having one or more features consistent with the presently disclosed subject matter.

FIG. 2 depicts an implementation of an attachment 200, or modular exercise accessory. The attachment 200 may include a handgrip 202. The handgrip 202 may be coupled with and mounted horizontally within a mounting mechanism 204. The mounting mechanism 204 may be configured for mounting the attachment 200 in any of a number of apertures or openings in a deck, such as deck 100 as shown in FIG. 1. The aperture or opening can be positioned at any location in the deck 100. The mounting mechanism 204 can be circular ring for fitting within a circular opening in the deck. In such an implementation, the mounting mechanism 204 can be snap-fit into the opening, by way of one or more pins that extend, retractable or not, from the mounting mechanism 204, or the mounting mechanism 204 can take any shape to correspond with a shape of the aperture. For instance, the aperture may be squared, and the mounting mechanism can include a squared frame that is sized and adapted to fit within the squared aperture, as well as one or more pins, latches, tabs, grooves, or the like, to interlock with a corresponding structure at the aperture in the deck.

The handle 202 of the attachment 200 can be tubular, or can include one or more bulges, protuberances, ridges, grooves, channels, finger grips, etc., so as to allow a better grip by a user's hand. In some preferred implementations, the handle 202 can be horizontal, i.e. in a plane of the top surface of the deck when the modular exercise accessory 100 is coupled with the deck. In other implementations, the handle 202 can include at least one portion that is angled away from a plane of the board. The handle 202 can also be covered or wrapped at least in part by a compressible material such as foam, plastic, rubber, or the like, or can be formed of a unitary rigid material along with the mounting mechanism 204.

The attachment 200 can further include a coupling mechanism 206 to lock the mounting mechanism 204 of the attachment 200 in a fixed mounted position with the aperture and deck. As illustrated in FIG. 2, the coupling mechanism 206 includes an actuator 208 that actuates a locking member 210. In some preferred implementations, the locking member 210 is a tab, or pin, that fits into a corresponding receiving notch in an opening, or through passage, of the deck. In some other implementations, the locking member 210 can be one or more of a pin, a latch, a bolt, a screw, a threading, a groove, a ridge, or the like, that cooperates with a corresponding structure on the deck or opening.

In some variations of the presently disclosed subject matter, the coupling mechanism 206 may be disposed in the deck and include a locking member 210, such as a tab or pin, that is configured to engage with a corresponding notch disposed in the one or more attachments 200. In some variations, multiple coupling mechanisms 206 each having a locking member 210 and corresponding notch may be disposed about the attachment, or modular exercise accessory, 200.

The locking member 210 may be extended and retracted by operation of the actuator 208. In some implementations, the actuator 208 is a spring-loaded button within the handle 202 and/or mounting mechanism 204. The spring-loaded button can be biased to extend the locking member 210, so as to maintain the locking member in the corresponding locking structure of the deck or aperture, and which bias can be overcome by user activation (i.e. sliding the button toward the center of the attachment 200 and away from a side of the aperture) of the actuator 208. In other implementations, the actuator 208 can be a spring loaded button that is mounted so as to extend upwardly, either perpendicular or at an angle, from the handle 202 and/or mounting mechanism 204, and which drives the locking member 210 to retract and extend.

As discussed above, the locking member 210 has a locked position, such as being a tab that is extended from the mounting mechanism, and an unlocked position, such as when the tab is retracted into the mounting mechanism. Other forms of locked and unlocked positions can be employed, such as a hinged latch that can be actuated to rotate to connect with a ridge or indent, or other latch, at the aperture or deck. In preferred implementations, the attachment 200 includes only a single locking mechanism 206 for enabling one-handed operation of the actuator 208 and coordinated removal or mounting of the attachment 200 from or to the deck, respectively. In other implementations, the attachment 200 can include two or more locking mechanism 206, arranged on the attachment 200 for greater securement and locking, and lowering the ease with which the attachment 200 can be disengaged from the deck. In some implementations, a single actuator 208 may operate the multiple locking members 210.

In some implementations, the mounting mechanism 204 of the attachment 200 may include a flange 212. The flange 212 may be configured to engage with a complementary flange in one or more apertures, or openings, in a deck, such as deck 100 shown in FIG. 1. The flange 212 may be configured to rotatably engage with a complimentary flange(s) of one or more apertures, or openings, in a deck, such as to be screwed into the apertures, or openings, in the deck.

Figure 3:
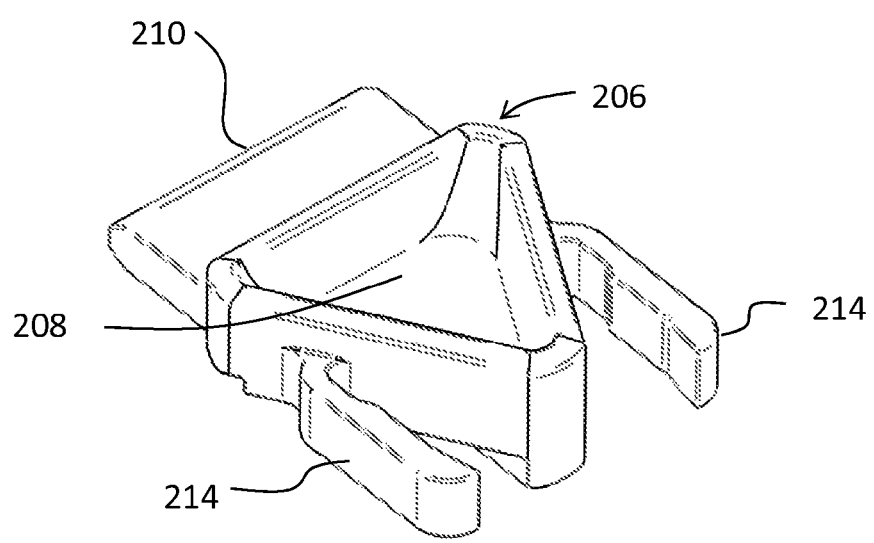
FIG. 3 depicts an exemplary implementation of a locking mechanism for use with an attachment having one or more features consistent with the presently disclosed subject matter.

FIG. 3 shows an exemplary embodiment of a locking mechanism 206 for use with an attachment 200. The locking mechanism 206 may include an actuator 208 and a locking member 210. As discussed above, the locking member 210 may be extended and retracted by operation of the actuator 208. The actuator 208 may be a spring-loaded button disposed within the attachment 200. The spring-loaded button can be biased to extend the locking member 210 laterally with the attachment 200. The spring-loading may be provided by one or more biasing elements 214. The locking mechanism 206 may be disposed in the attachment 200 in a locking mechanism receiver 216 (as shown in FIG. 2). The locking mechanism receiver 216 may include a locking mechanism cover 218 configured to secure the locking mechanism 206 into the locking mechanism receiver 216. The locking mechanism receiver 216 may have a shape complimentary to the locking mechanism 206. The locking mechanism receiver 216 may have a shape adapted to engage with the one or more biasing elements 214. The shape of the locking mechanism housing 216 may cause the biasing elements 214 to be deformed inwardly, toward each other, when the actuator 208 is slid laterally away from the perimeter of the attachment 200. Deforming the biasing elements 214 inwardly may cause the biasing elements 214 to become biased and tend to try to reposition themselves in their original configuration. The shape of the locking mechanism housing 216 may be such that when the actuator 208 is slid sideways and then released the locking mechanism 206 slides laterally in the locking mechanism receiver 216 causing the locking member 210 to extend from the periphery of the attachment 200.

In some variations, the locking member 210 may be configured to retract when the attachment 200 is initially disposed in an opening of the deck. The locking member 210 may include a sloped portion and when the attachment 200 is pushed into an opening of the deck the perimeter of the opening engages with the sloped portion causing the locking member 210 to retract and engage the biasing elements 214. When the locking member 210 is situated adjacent to a receiving notch, the locking member 210 may extend into the notch, due to the biasing elements 214 returning to their prior state. The apparatus may function similarly where the locking mechanism 206 is disposed in the board. Engagement of an attachment against the sloped locking member may cause the sloped locking member to retract.

Figure 4:
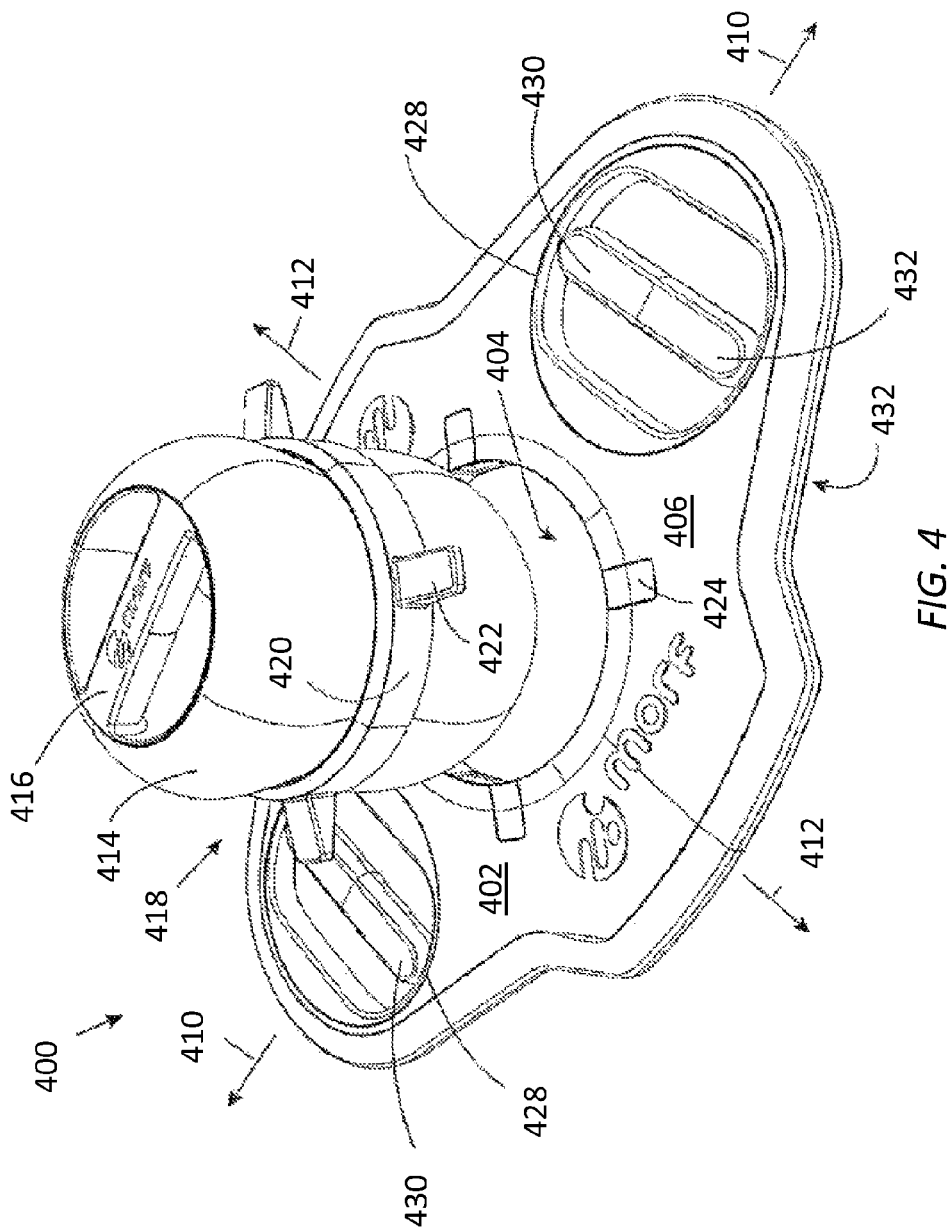
FIG. 4 is a perspective view of one embodiment of the disclosed modular exercise device having one or more features consistent with the presently disclosed subject matter.

As shown in FIG. 4, the fitness device 400 may be comprised of a deck 402 with a through passage 404 with a locking mechanism that allows users to quickly shift from one exercise mode to another by installing different attachments, or modular exercise accessories. Shown in FIG. 4 is an exercise board 400 which includes a deck 402 with a top surface 406 and a bottom surface 408. The deck 402 includes a long axis 410 and a short axis 412. At the intersection of the long and short axis is located a through passage 404 which provides an opening in the center of the deck 402. The through passage 404 is configured to receive a center module 14, which can take various configurations. The center module 414 can extend below the deck 402, it can extend above the deck 404, it can be flush with the surface of the deck either above or below, and it can also be flush with both the top and bottom surface of the deck. Such a configuration may occur when the exercise device 400 is modified for use as a skateboard, as discussed in reference to other figures. In implementations consistent with the illustration of FIG. 4, the center module 414 can have a hand grip 416 at its top, above the deck.

The exercise board includes a mounting mechanism 418 which can be a rotating ring 420 such as that shown in FIG. 4. The rotating ring may be a stationary ring relative to the deck 402, but allow the center module 414 to rotate relative to the rotating ring 420. In the mounting mechanism of FIG. 4, extending tabs 422 extend out from the rotating ring 420 and fit into slots 424. The slots 424 can allow the rotating ring 420 to lock into place by a partial twist of the rotating ring, or they can fit into threads which allow the rotating ring 420 to be secured by threading it into place. Shown in FIG. 4 is a pair of lateral receiving positions 428. The lateral receiving positions 428 may be exercise accessory receivers. The lateral receiving positions 428 may be disposed on either side of the center module 414. The lateral receiving positions 428 may be configured to facilitate removable installation of a number of different types of exercise accessories 430. In the view shown in FIG. 4, the exercise accessory is a hand grip 432, but other types of exercise accessories are available, and it is an important concept of the present device that the exercise board utilizes a center module selected from a number of available center modules, and exercise accessories selected from a number of available exercise accessories.

The board 400 can be various sizes and shapes. In many configurations the deck 402 is longer in the long axis 410 than in the short axis 412. The deck can be made of a number of materials, including plastic, wood, graphite, aluminum, or other materials which are suitably strong and light for the intended purpose of exercise. The top side 406 of the deck can be plastic polyethylene, and can have a textured surface for grip and aesthetic appeal. One typical configuration of the deck would be 26.7 in long, and 14.9 in wide, with a deck thickness of 0.78. The receiver positions, or modular exercise receivers, can be from 1.5 in to 3 inches in diameter, for example. The through passage 404 can be 8.6 inches to 10 inches in diameter, as an example.

The underside of the deck can be lined with hard plastic rails that allow the board to easily slide across any smooth surface. This allows users to perform a wide range of core-strengthening exercises and upper- and lower-body strength-training exercises, such as abdominal pikes, offset push with lateral extension, and reverse lunges.

The disclosed exercise device may include a threaded locking system for the center module. The threaded locking system for the center module may include a dual-phase mechanism that secures center module attachments. Center module units will assert an upward or downward force into the deck 402 via the through passage 404, twist, and lock into place. Center module attachments may be configured to remain locked in place in the deck 402 until released. Such release may be facilitated by a release button or other release device, on the top or bottom side of the deck 402 adjacent the through passage 404. Such release device may be a release button, or actuator, disposed in the center module attachment 414. In some variations, the release device may be disposed in the rotating ring 420.

In some variations of the present subject matter, users can remove center module attachments and/or modular exercise accessories by twisting them out of the threaded opening, or bayonet.

Figure 5:
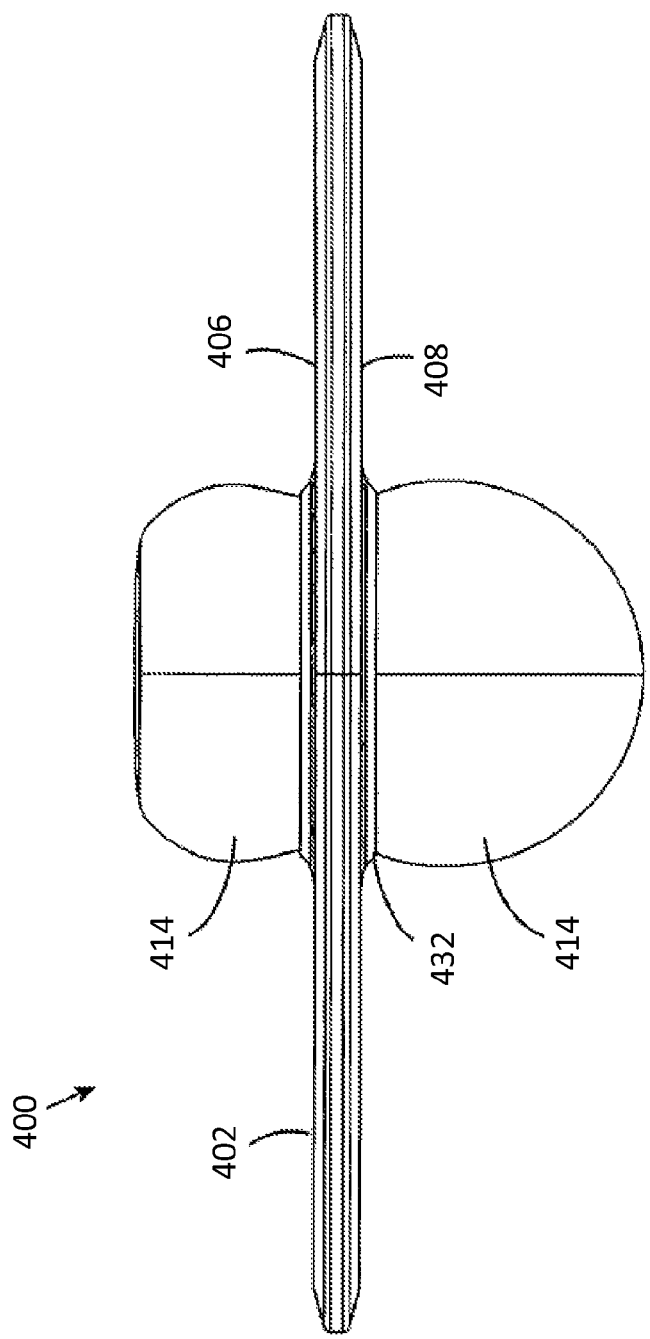
FIG. 5 is a side view of an embodiment of the disclosed technology having one or more features consistent with the presently disclosed subject matter.

Depending on the configuration that the user chooses to create with the exercise board 400, by combining different center modules 414 and different modular exercise accessories 430, the side view of the device could look quite different than illustrated in FIG. 4. Shown in FIG. 5 in side view is a ring structure 432 which is one type of mounting means for securing the center module 414 to the deck 402. Also shown in FIG. 5 is a side view of a particular example of a center module 414. This particular example of a center module 414 is made up of a lower half which is generally a half sphere, and a partial sphere on the top, above the deck. The upper portion of this particular example of a center module 414 has a top that is flat with a handle. This version of the center module 414 is called a bounce ball, and it is preferably inflated rather than solid. It is resilient and made of a flexible material, such as rubber, urethane, PVC or another flexible material.

The bounce ball is configured to create a very unstable surface so that the user uses the motion of bouncing to develop balance, coordination and strength. Additionally, the bounce ball attachment develops the cardiovascular system as the bouncing action mimics that of a rebounder or mini trampoline. Bouncing will increase the user's heart rate, so the bounce ball attachment is well suited for interval training where users bounce vigorously for a short period of time to spike their heart rate, and then slow or stop the bounce to recover. The process is repeated for a desired period of intervals over a desired period of time. To bounce, the user stands on the deck. Foot straps can be used, or the feet can be placed over hand grips or handles, or the lateral receiver positions can be loaded with discs that cover the openings. To bounce, users can strap feet into the board using the lateral attachments or they can squeeze the above deck portion of the ball between their feet for grip. A small initial hop by the user can be built into larger bounces as the user initiates the bouncing movement. The topside is designed so the feet can wedge underneath the most bulbous part of the ball to give grip and control.

The bounce ball attachment version of the center module 141 can be used for both upper and lower body strength exercises such as pushups or squats. For a pushup, the hands can be anywhere on the deck, but they will most likely be used in the hand grip 432 configuration in the modular exercise accessories attachment positions. Through these exercises, users develop greater balance, core strength, and engage stabilizer muscles.

Figure 6:
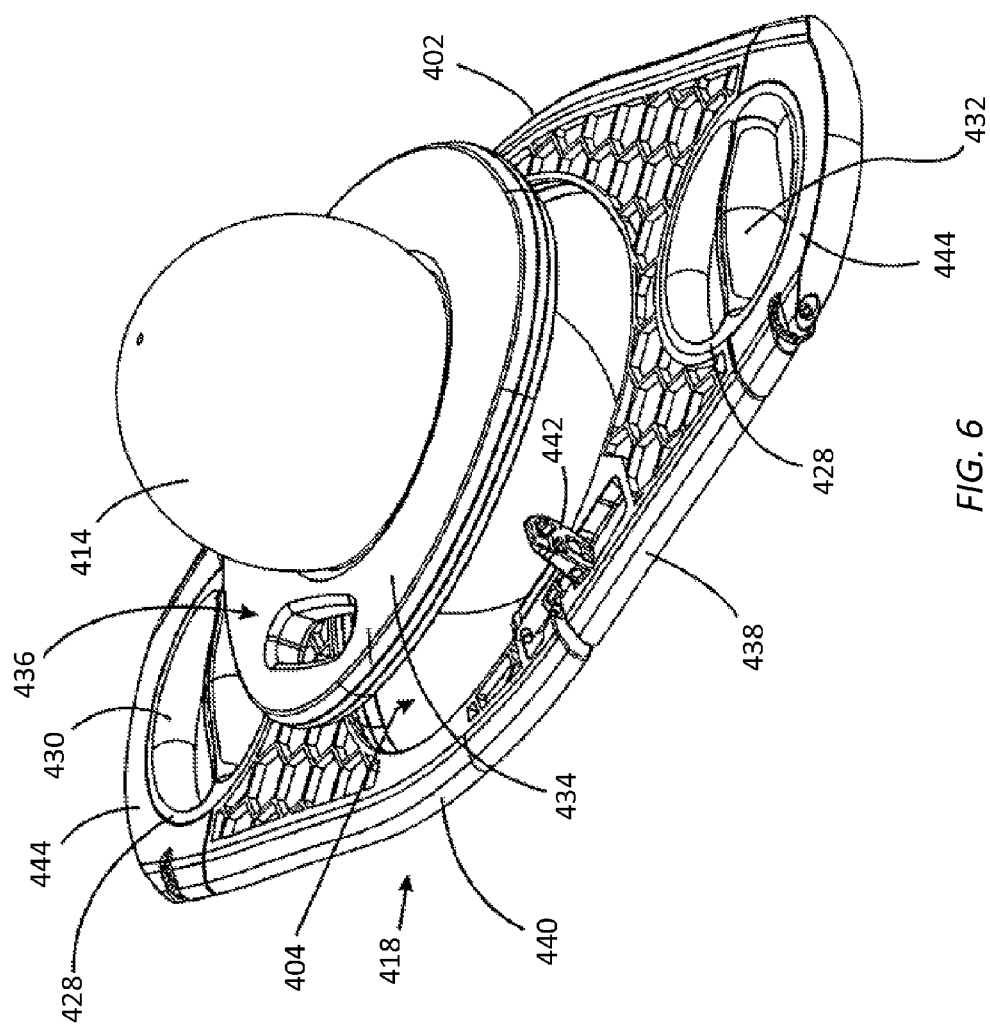
FIG. 6 is a perspective view of one embodiment of the disclosed technology, having one or more features consistent with the presently disclosed subject matter.
Figure 10:
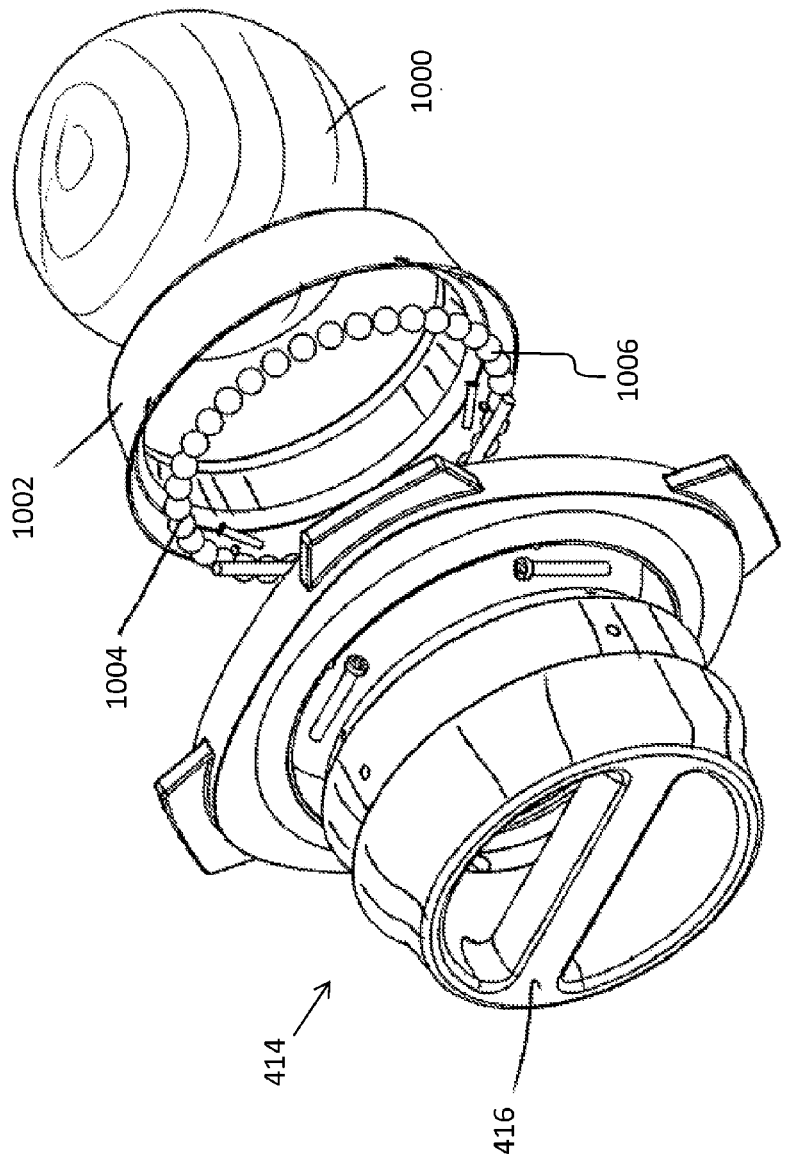
FIG. 10 is an exploded view of the roller ball version of center module for use with an exercise device having one or more features consistent with the presently disclosed subject matter.

Referring to FIG. 6, the fitness device can include a center module 414 in the form of an inflatable shaped ball, such as shown in FIG. 10, that features a ring causing the inflatable ball to be at its narrowest point at the ring. The ring facilitates securing of the ball to the deck 402. FIG. 6 is an embodiment of the device and includes a center module similar to that shown in FIG. 3. It also includes a ring structure 434, which fits into a mounting means 418. In this case the ring structure 434 is larger than that shown in FIG. 1 and includes a hand grip 436. In the view shown in FIG. 6, the deck 402 is formed of a first half 438 and a second half 440, with the two halves locked together by a lock 442. The lock 442 may be a cam lock. In this particular embodiment the cam lock 442 is part of the mounting means 48, and because it reduces the circumference of the through passage 404, it thus locks the deck 402 more tightly around the ring structure 434. The version shown in FIG. 6 also includes end pieces 444 which are attachable and removable from the deck 402. The end pieces 444 sandwich the selected modular exercise accessory 430 into the lateral receiver position 428. In this case, the hand grip 432 is the selected lateral exercise accessory 430.

Additionally, the exercise device can include removable elastic resistance bands that fit into clip structures or grooves at the bottom of the unit and through the handles at either side. This feature allows users to easily hold onto the fitness device as they jump, using bands held in the hands and attached to the deck. It also allows them to engage in strength-training exercises, such as bicep curls and deltoid raises.

Figure 7:
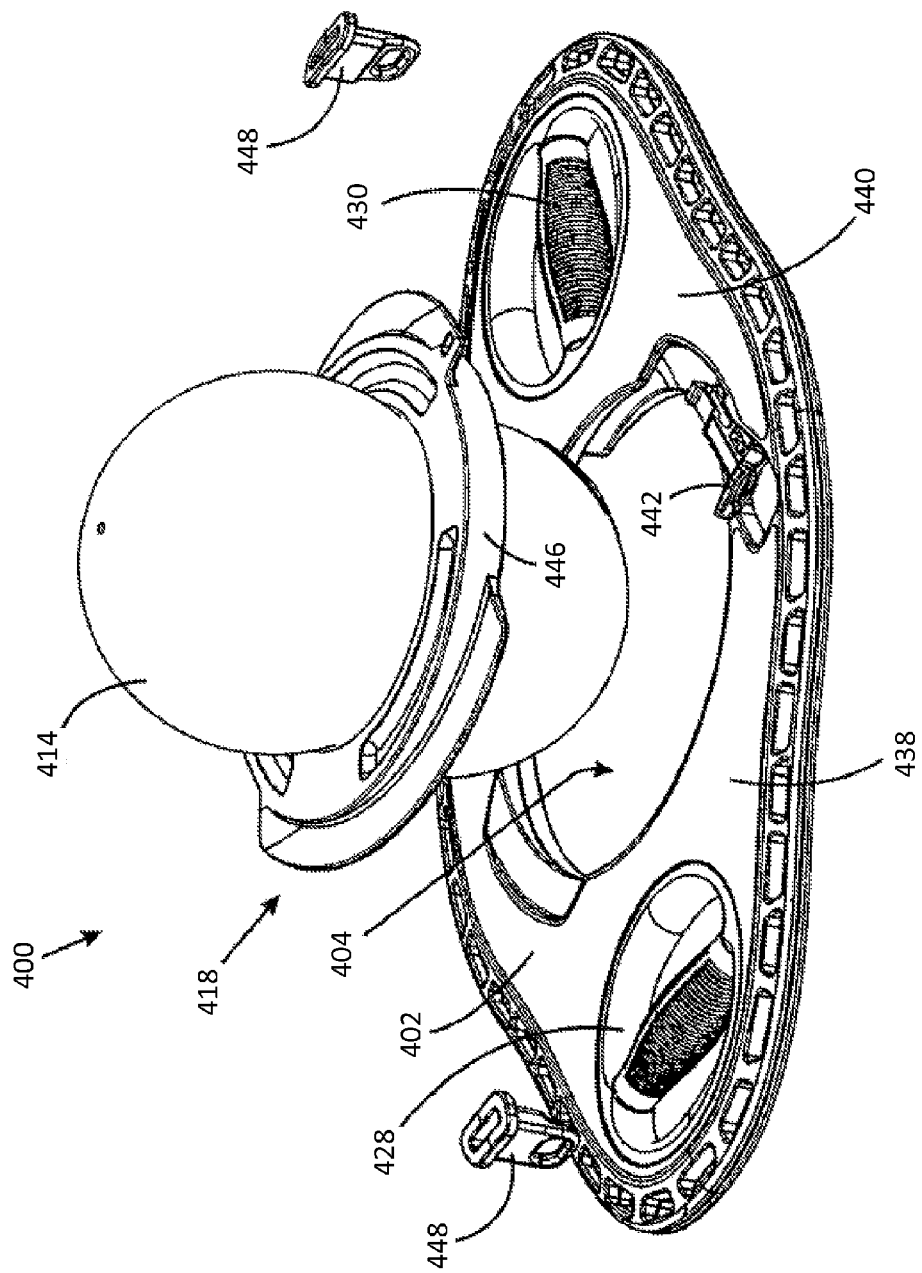
FIG. 7 is a perspective view of an embodiment of the disclosed technology, having one or more features consistent with the current subject matter.

FIG. 7 shows a variation of the exercise board 400 which includes a center module 414 which in this particular example extends above as well as below the deck 402. The mounting means 418 in this particular example is a pair of arcuate tabs which fit into corresponding slots and allow the mounting ring 446 to be rotated a partial turn in order to secure it into the through passage 404 of the deck 402. The embodiment shown in FIG. 7 also includes a first half 438 and a second half 440 of the deck 402 which as in the case of the device shown in FIG. 6. A lock 442, such as a cam lock, secures the mounting ring 446 in place securely and joins the first half 438 with the second half 440. Shown in FIG. 7 are modular exercise accessories 430 which are similar to those previously shown. Also shown in FIG. 7 are band anchors 448. The band anchors 448 clip into place on the deck, and allow the attachment of resilient exercise bands. The exercise bands can be utilized with handles on one end for such exercises as bicep curls, deltoid raises, or other exercises which can act against these bands.

Figure 8:
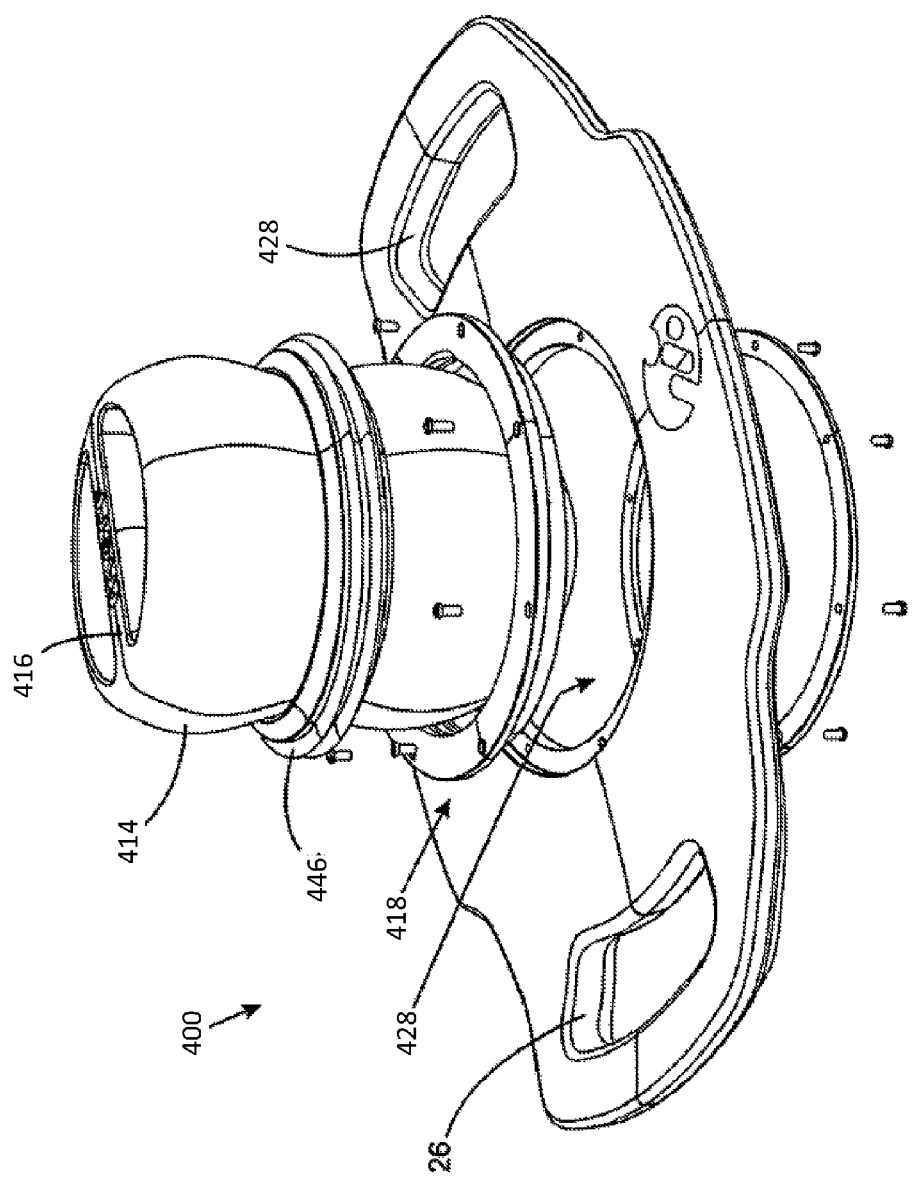
FIG. 8 is an exploded perspective view of an embodiment of the disclosed technology, having one or more features consistent with the current subject matter.

FIG. 8 shows another version of the exercise device 400 which includes a center module 414 with a mounting ring 446 which is part of a mounting mechanism 418. This device includes a through passage 404, and in this case the modular exercise accessory receivers 428 are without a modular exercise accessory. The modular exercise accessory receivers may be configured to form hand grips without any attachments. The upper portion of the center module 414 includes a hand grip 416.

Figure 9:
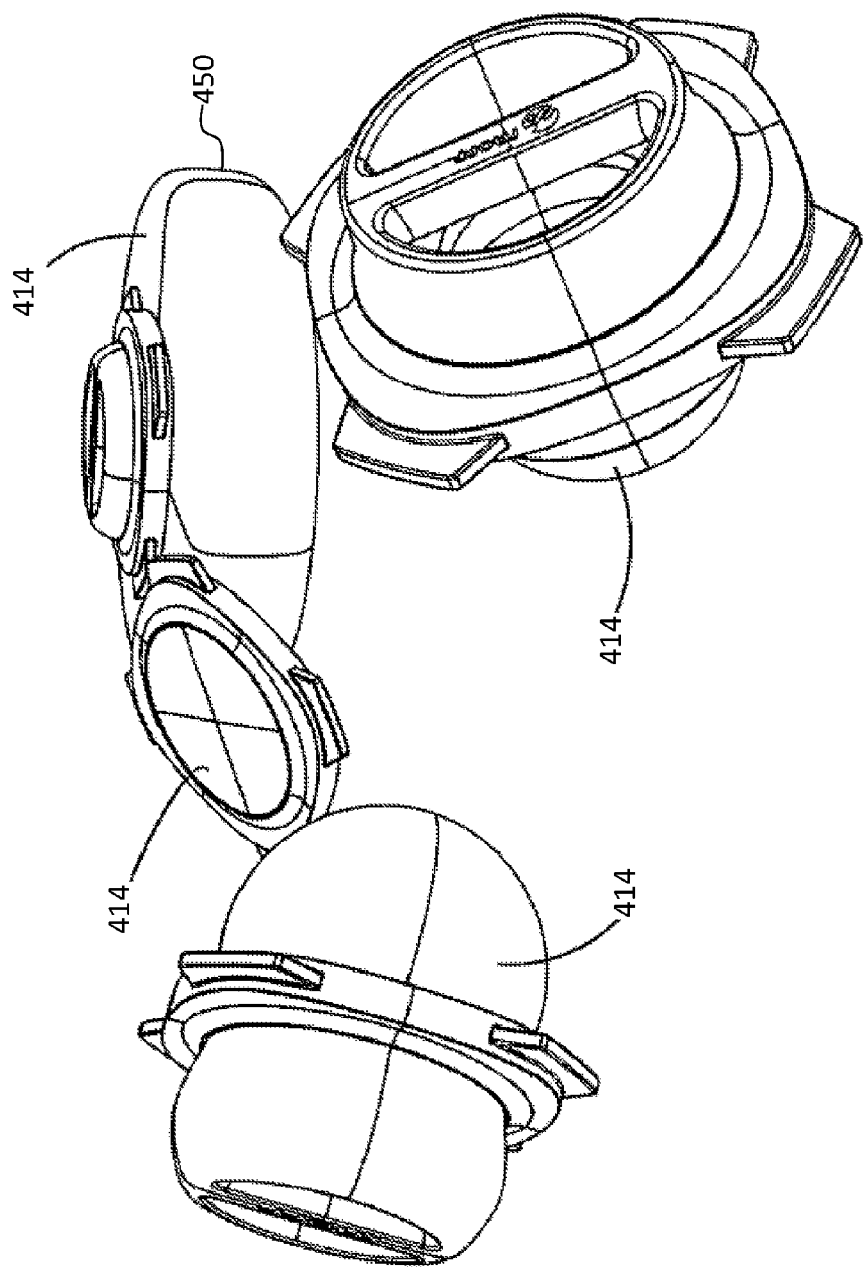
FIG. 9 shows a variety of center modules for an exercise board having one or more features consistent with the presently disclosed subject matter.

FIG. 9 shows a variety of center modules 414 including some that protrude above and below the deck, some that are flush with the deck, some that protrude only below the deck and some that protrude only above the deck are also possible. The center module on the left is a bounce ball, the next to the right is a deck plug, at the top left is a halo destabilizer, and the center module on the lower right is a roller ball, which has a rotating ball on one side of the center module, which can roll in any direction on the floor. A version of the bounce ball is one in which mechanical devices such as springs are included, to enhance the energy returned to the user in the form of bounces. This version of the bounce ball is called an aggressive bounce ball.

FIG. 9, middle figure shows an optional center module called the halo destabilization module 450. The function of the halo destabilization module is to create a moderate and variable unstable surface that increases difficulty, develops and improves stability and strength through a wide range of upper and lower body exercises. The user can stand on the deck with the halo destabilization module in place, and do such exercises are bicep curls with free weights. While he is doing other exercises, he has to balance on the wobbling and unstable deck, so he is working on core muscles at the same time as doing bicep curls, as one example. He can also do pushups with the halo destabilization module in place, and get a different workout than regular pushups, due the need to use more muscles to balance on the constantly shifting deck. The material of the halo destabilization module would typically be a softer and more flexible material, and could be a solid foam or a soft inflated shape.

Figure 11:
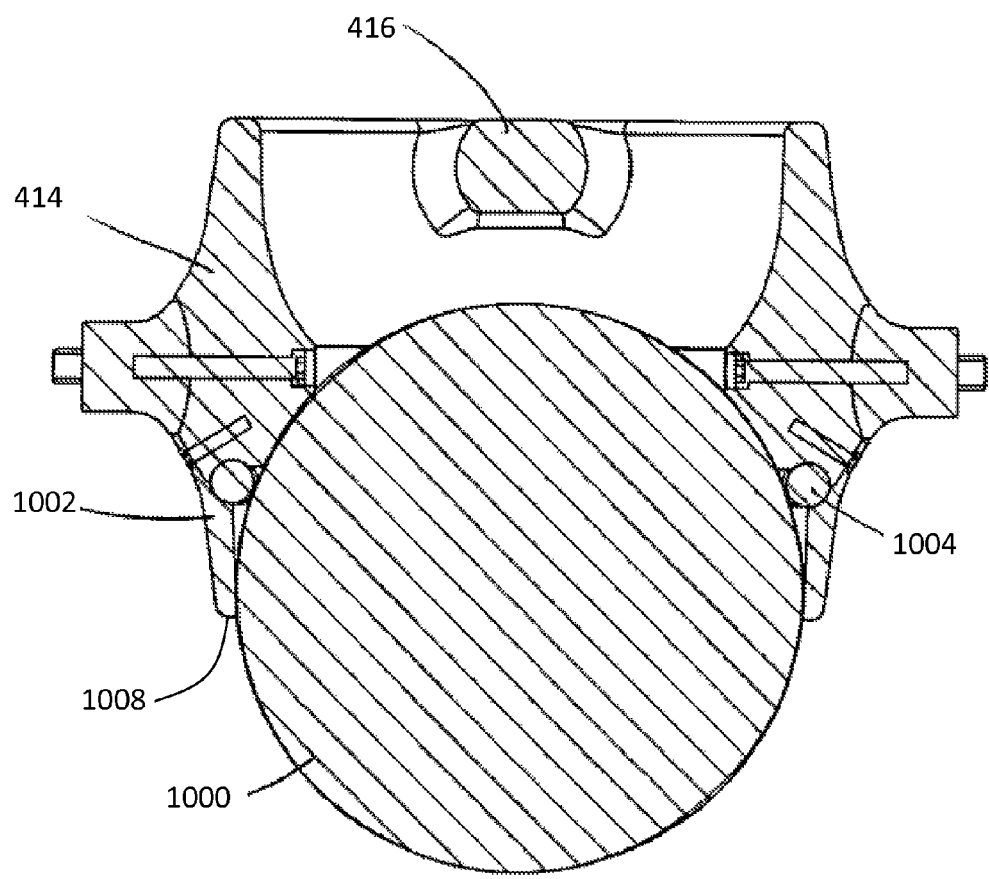
FIG. 11 is a cross sectional view of the roller ball version of center module illustrated in FIG. 10.

FIG. 10 shows an exploded version of the center module 414 which is a roller ball. FIG. 11 shows a cross sectional view of the center module 414 illustrated in FIG. 10. The roller ball engages with the ground and the deck and can be moved in any direction. In the configuration illustrated in FIG. 10, the roller ball 1000 is capable of freely rolling inside the housing 1002. This could be used for ab roll outs, where the user has her knees on the floor, and pushes the device forward to full extension, and pulls it back using abdominal muscles with the ball rolling moving under the user's direction. This configuration would facilitate a core workout by the user. The roller ball 1000 is secured by a housing 1002. The housing may include a bearing 1004. The bearing 1004 may be disposed perpendicular to an axis of the center module 414. The 1004 bearing may comprise a plurality of ball bearings 1006. The bearing 1004 may facilitate movement by ball 1000 in any direction. In some variations, the bearing 1004 may limit the movement by the ball 100 in a limited amount of directions.

In some variations, the ball used in the roller may be a spherical ball having harder consistency than the inflatable ones in other center modules as shown in some of the center modules in FIG. 9. The roller ball 1000 is secured to the center module 414 by a housing 1002. A bottom portion 1008 of the housing 1002 may extend below the widest part of the ball 1000. A bearing 1004, such as ball bearings, smooth plastic, Teflon, or another type of bearing, may be used to facilitate rolling by the captured ball. In some variations, the bearing 1004 may be below the widest part of the ball 1000. In some variations, the housing 1002 may comprise multiple bearings to facilitate movement by the ball 1000 when force from any direction is applied to the ball 1000. The free movement may be facilitated through the ball's 1000 interaction with a horizontal bearing 1004 that surrounds the ball 1000. The housing 1002 that encases the roller ball 1000 and the surrounding bearing 1004 may be opened from the top. This allows for dirt and debris to be cleaned out easily. This configuration of center modules may facilitate core exercises and strength training. As the ball moves in every direction, it makes contact with the bearing for a smooth rotation of the ball.

An important feature of the disclosed technology is that the center module can be one of several units, the modular exercise accessories can be one of several units, all of which can be selected by the user for the exercise he wants to do.

Figure 12:
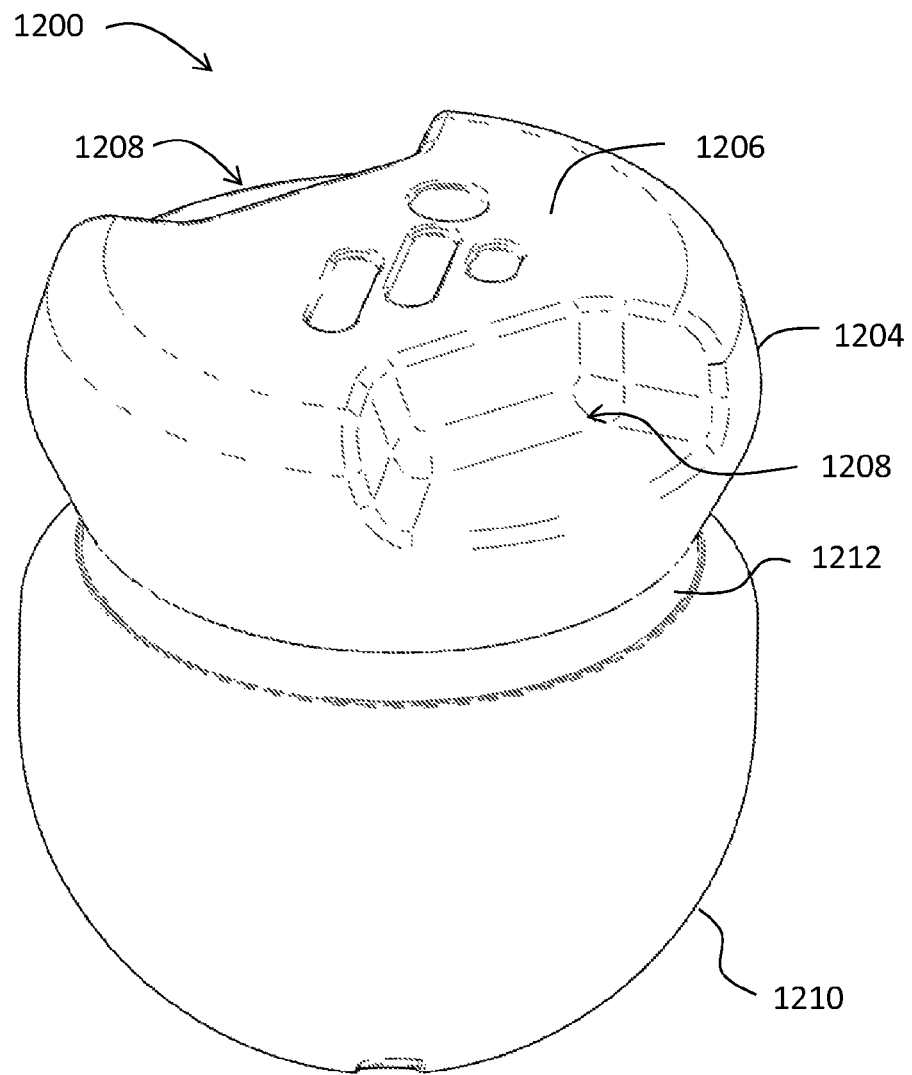
FIG. 12 is an illustration of a center module for use with an exercise device devise having one or more features consistent with the disclosed subject matter.
Figure 13:
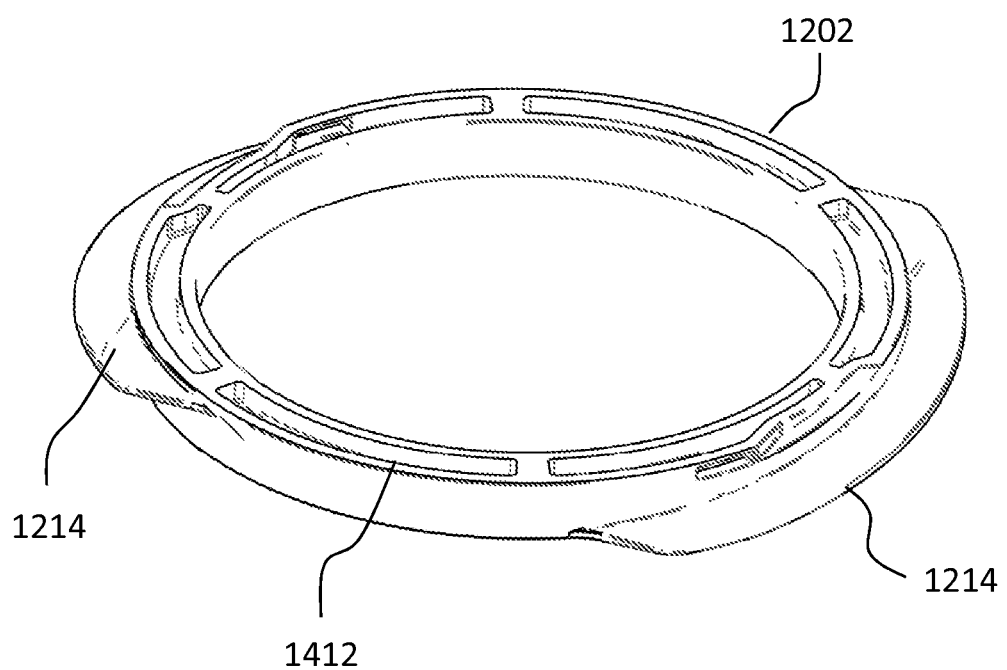
FIG. 13 is an illustration of an engagement ring for use with the center module illustrated in FIG. 12.

FIG. 12 shows an implementation of center module 1200 for use with an exercise device having one or more features consistent with the presently disclosed subject matter. FIG. 13 shows an implementation of a mounting ring 1202. The mounting ring 1202 may be used in conjunction with center module 1200 to mount the center module 1200 into the deck of an exercise device. Such a deck is illustrated in FIG. 1. The center module 1200 may include an upper portion 1204 configured to stand proud of the top of the deck when the center module 1200 is mounted to the deck. The upper portion 1204 may include a handle portion 1206. The handle portion 1206 may be facilitated through indented portions 1208 in the top portion 1206 of the center module 1200. The indented portions 1208 may be formed in the top portion 1206 of the center module 1200 by way of a mold. In some implementations, the indented portions 1208 may be carved from the top portion 1206.

The center module 1200 may include a bottom portion 1210. The bottom portion 1210 may be configured to extend below the bottom of the deck when the center module 1200 is mounted into the deck. The bottom portion 1210 may have an arcuate shape. The arcuate shape of the bottom portion 1210 extending below the bottom of the board may destabilize the board. A destabilized board may facilitate a user engaging core muscles to keep the exercise device upright and the board substantially horizontal to the ground, when the board is in use.

The center module 1200 may include a mounting ring engaging portion 1212. The mounting ring engaging portion 1212 may include a portion of the center module 1200 that is narrower than surrounding portions of the center module 1200. The mounting ring engaging portion 1212 may facilitate securing the mounting ring 1202 to the center module 1200. The mounting ring engaging portion 1212 may be formed by a mold. The mounting ring engaging portion 1212 may be formed by being carved from the center module 1200.

In some variations, the center module 1200 may be inflatable. The mounting ring 1202 may be affixed to the inflatable center module 1200 during inflation. The center module may be disposed through the mounting ring 1202 and inflated. The center module 1200 may be disposed in the mounting ring 1202 such that the mounting ring engaging portion 1212 couples with the mounting ring 1202 as the inflatable center module 1200 is inflated. In some variations, the mounting ring 1202 may be affixed to the center module 1200 (where the center module 1200 may or may not be inflatable) by being bonded to it. The mounting ring 1202 may be bonded to the center module 1200 at the mounting ring engaging portion 1212. In some variations, the mounting ring 1202 may be contiguous with the center module 1200.

The mounting ring 1202 may include mounting flanges 1214. The mounting flanges 1214 may engage with complimentary flanges in the periphery of the passage 404 of the deck 402 as illustrated in FIG. 4. Engagement by the mounting flanges 1214 with the complimentary flanges in the periphery of the passage 404 of the deck 402 may occur through rotational engagement. Engagement by the mounting flanges 1214 with the complimentary flanges in the periphery of the passage 404 of the deck 402 may occur facilitate securing the center module 1200 into the deck.

Figure 14:
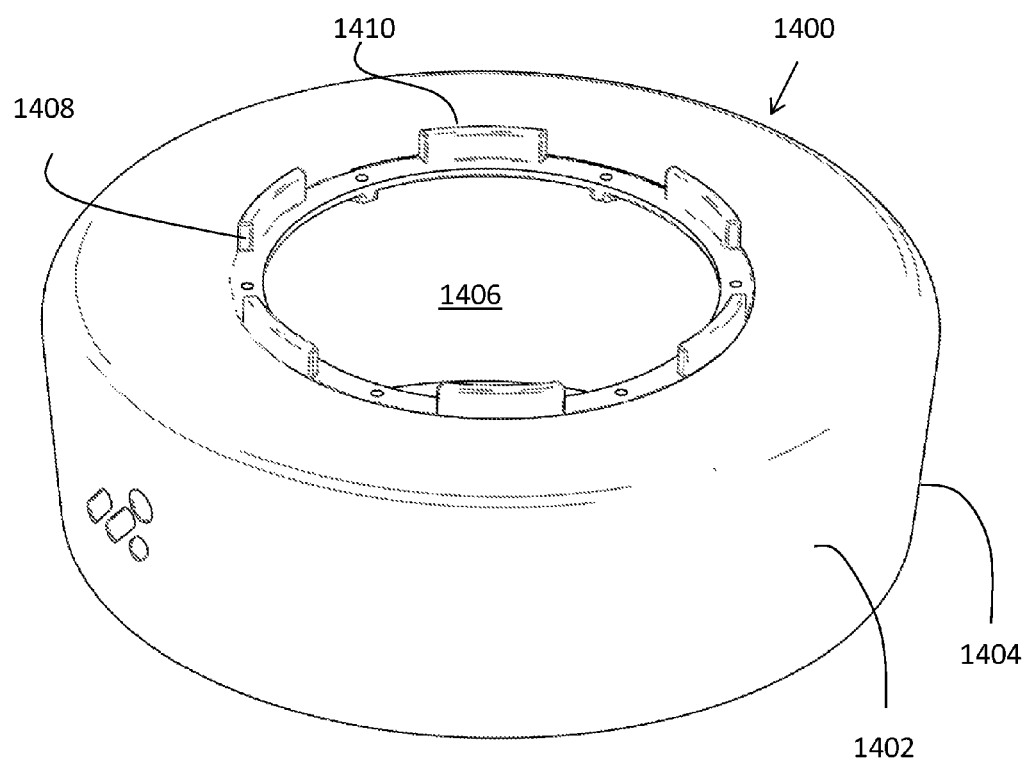
FIG. 14 is an illustration of a center module for use with an exercise device having one having one or more features consistent with the disclosed subject matter.

FIG. 14 shows an illustration of a center module 1400 for an exercise device having one or more features consistent with the presently disclosed subject matter. The particular center module 1400 illustrated in FIG. 14 is a halo destabilizer. The function of the halo destabilization module 1400 is to create a moderate and variable unstable surface that increases difficulty, develops and improves stability and strength through a wide range of upper and lower body exercises. The halo destabilizer may include a circular support 1402. The circular support 1402 may be compressible. Upon compression of the circular support 1402 the outer periphery 1404 and the inner periphery 1406 may flex. The halo destabilizer may include a mounting ring 1408. The mounting ring 1408 may be configured to secure the halo destabilizer to a board of an exercise device having one or more features consistent with the presently disclosed subject matter. An example of such a board is illustrated in FIG. 1.

The mounting ring 1408 may be configured to engage directly with the board. The mounting ring 1408 may be configured to engage with an intermediate ring, which, in turn, is configured to engage with the board. The mounting ring 1408 of the halo destabilizer may include mounting pins 1410. The mounting pins 1410 may be configured to engage with mounting pin receivers 1412 in a mounting ring 1202, as shown in FIG. 13. The mounting pins 1410 may be configured to slidably engage with the mounting pin receivers 1412. This may facilitate rotation by the deck around the halo destabilizer providing an additional degree of freedom.

Figure 15:
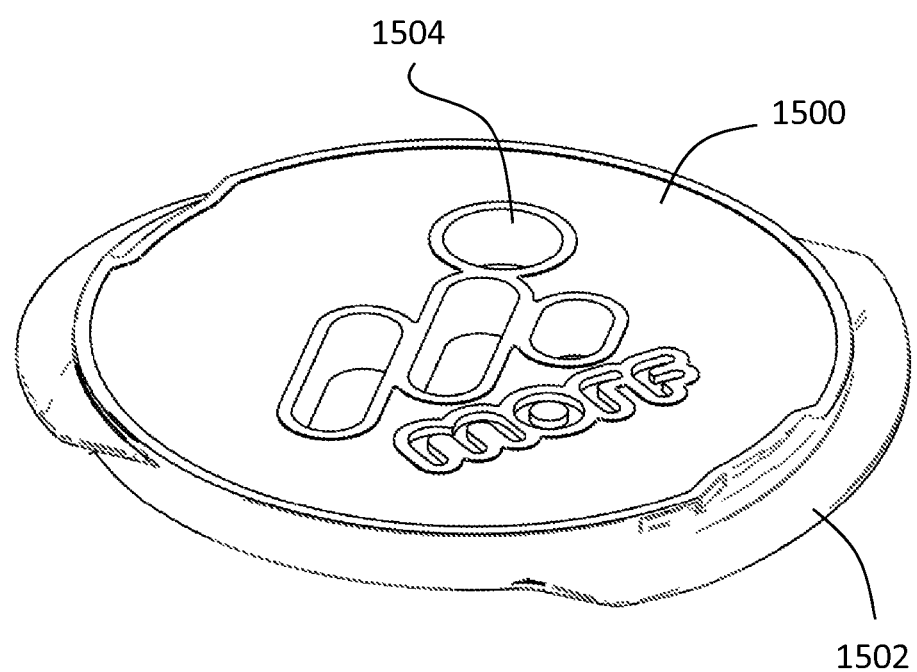
FIG. 15 is an illustration of a center module for use with an exercise device having one having one or more features consistent with the disclosed subject matter.

FIG. 15 shows an embodiment of a center module 1500 for use with an exercise device having one having one or more features consistent with the disclosed subject matter. The center module 1500 may be configured to cover the through passage of the deck. Such a center module 1500 may be used when other center modules are not in use, but, say, one or more of the modular exercise accessories are in use. The center module 1500 may have a coupling mechanism to couple the center module 1500 to the coupling mechanism of the through passage of the deck. The center module 1500 may comprise one or more flanges 1502 as a coupling mechanism for coupling the center module 1500 to the deck. The one or more flanges 1502 may engage with a complementary coupling mechanism(s) of the deck. The center module 1500 may be coupled with the deck by rotating the center module 1500 into the through passage of the deck, thereby engaging the one or more flanges 1502 with the complementary coupling mechanism(s) of the deck. The center module 1500 may include finger holes 1504. The finger holes 1504 may facilitate handling by the user. The finger holes 1504 may be used by a user to rotate the center module 1500 into the through passage of the deck.

Figure 16:
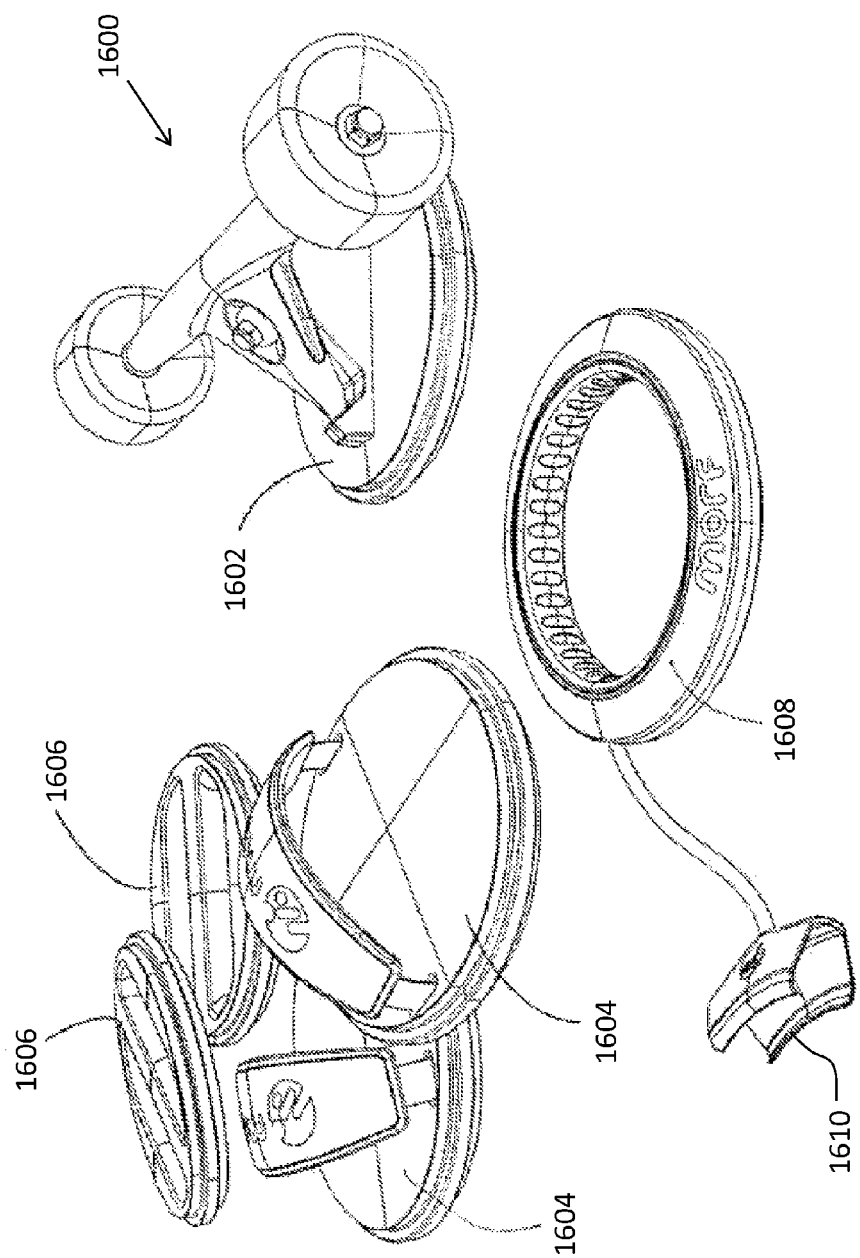
FIG. 16 is a perspective view of certain exercise attachments for use with an exercise device having one or more features consistent with the disclosed subject matter.

FIG. 16 shows several different attachments, or modular exercise accessories 1600 for attachment to the exercise board. Attachments, or modular exercise accessories 1600 may include a skate board truck 1602, a foot strap 1604, hand grips 1606, band attachment ring 1608, and other modular exercise accessories. The modular exercise accessory can also be a deck plug (as shown in FIG. 20). The band attachment ring 1608 may comprise a spooled band system. The spooled band system may attach to the ring 1608. The spooled band system may attach to the ring at one or more lateral positioning points. The spooled band system may be configured to allow the user to adjust the bands' resistance level and/or length. Such bands may be used for resistance and strength training purposes. In some variations, a clip 1610 may be attached to the other end of the band. The clip 1610 may be configured to attach to a handle.

FIG. 17 shows an attachment 1700. The attachment 1700 shown in FIG. 17 is a skateboard truck. The exercise accessory 1700 may comprise a coupling mechanism 1702. The coupling mechanism 1702 may be configured to couple the attachment 1700 to an exercise accessory receiver on either end of the board. The attachment 1700 may include a locking mechanism receiver 1704. The locking mechanism receiver 1704 may be configured to receive a locking mechanism, such as the locking mechanism 206 illustrated in FIG. 3.

Two skateboard trucks may be coupled to the board. Each skateboard truck may be coupled to a different exercise accessory receiver on either end of the board. Such a configuration may resemble a skateboard. A user of the modular exercise device may use the modular exercise device as they would a skateboard.

FIG. 18 shows an attachment 1800. The attachment 1800 may be used in conjunction with a roller. The attachment 1800 may be configured such that when the board is placed on top of a roller, the attachment 1800 retards the movement of the roller with respect to the board. The attachment 1800 may comprise a relatively smooth portion 1802 configured to be flush with the underside of the board when the attachment 1800 is disposed in an exercise accessory receiver of the board. The attachment 1800 may comprise a lip 1804. The lip 1804 is configured to stop a roller from traveling past the lip 1804. The attachment 1800 may include a handle 1806. The handle 1806 may be configured to facilitate orientation of the attachment 1800. The lip 1804 may be orientated such that the lip is substantially perpendicular to the long axis and substantially parallel to the short axis of the board.

The attachment 1800 may include a locking mechanism receiver 1808. The locking mechanism receiver 1808 may be configured to receive a locking mechanism, such as the locking mechanism 206 illustrated in FIG. 3. When the attachment 1800 is disposed in a modular exercise receiver in the board such that the locking mechanism engages with the board, the lip 1804 may be correctly positioned. Two modular exercise accessories 1800 may each be disposed in opposite modular exercise receivers. In such a configuration, the board may be positioned on top of a roller, such that the roller is positioned substantially parallel to the short axis of the board. A user may stand on the board and balance the board on the roller such that no part of the board is directly engaged with the ground. The lip 1806 on each of the modular exercise accessories 1800 may prevent the board from being moved relative to the board in such a manner that would cause the roller to roll past the end of the board.

FIG. 19 shows a roller 1810. The roller 1810 may be used in conjunction with the attachment 1800 shown in FIG. 18. The roller 1810 may comprise a roller surface 1812. The roller 1810 may comprise different roller surfaces 1812. The different roller surfaces 1812 may have different properties. One of the different roller surfaces 1812 may include properties that make the roller surface 1812 malleable and relatively soft compared to other roller surfaces 1812. Such a roller surface may make balancing the board on the roller relatively easy compared to other roller surfaces. Another of the different roller surfaces 1812 may include properties that make the roller surface 1812 relatively hard compared to other roller surfaces 1812. Such a roller surface may make balancing the board on the roller relatively difficult compared to other roller surfaces. Multiple different grades of roller may be available. When the roller 1810 is being used a center module having a bottom surface configured to be substantially flush with the bottom surface of the board, such as center module 1500 shown in FIG. 15, may be used to close the center opening of the board.

FIG. 20 shows an attachment 2000 for disposing in exercise accessory receivers on either end of the board. The attachment 2000 may be used as shown in FIG. 20 to cover the exercise accessory receivers of the board. In this way, the board may be used with center modules, such as the center modules shown in FIGS. 4-14, to facilitate a user standing on the board.

The attachment 2000 may include strap mounts 2002. Strap mounts 2002 may be configured to receive straps for footholds such as the footholds illustrated in FIG. 16 on modular exercise accessories 1604. In some variations, strap mounts 2002 may be configured to receive resistance bands. In some variations, the strap mounts 2002 may be configured to receive straps for handholds.

The attachment 2000 may include a locking mechanism receiver 2004. The locking mechanism receiver 2004 may be configured to receive a locking mechanism, such as the locking mechanism 206 illustrated in FIG. 3. When the locking mechanism is engaged with the board, it may cause the attachment 2000 to be properly oriented for one or more exercises.

Figure 21:
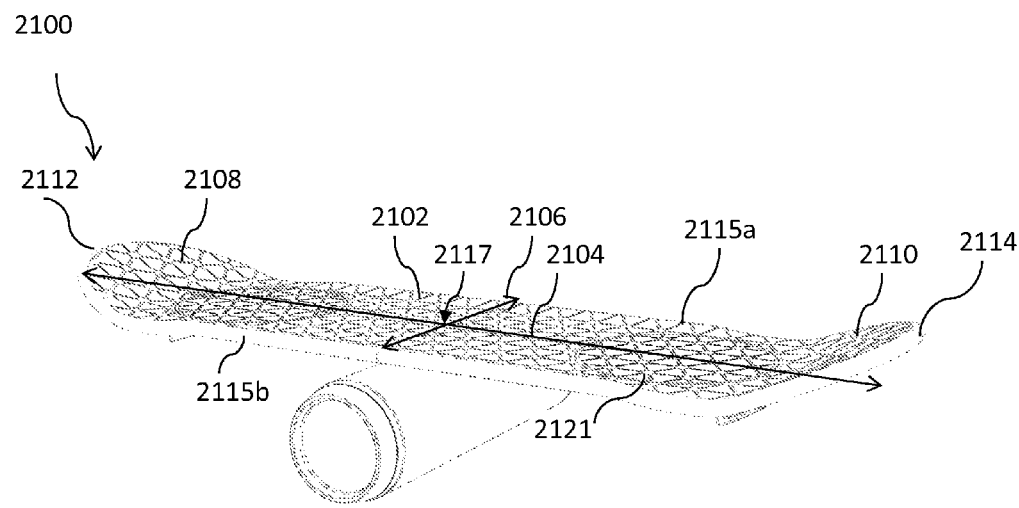
FIG. 21 is an illustration of a modular activity board having one or more features consistent with the disclosed subject matter.
Figure 22:
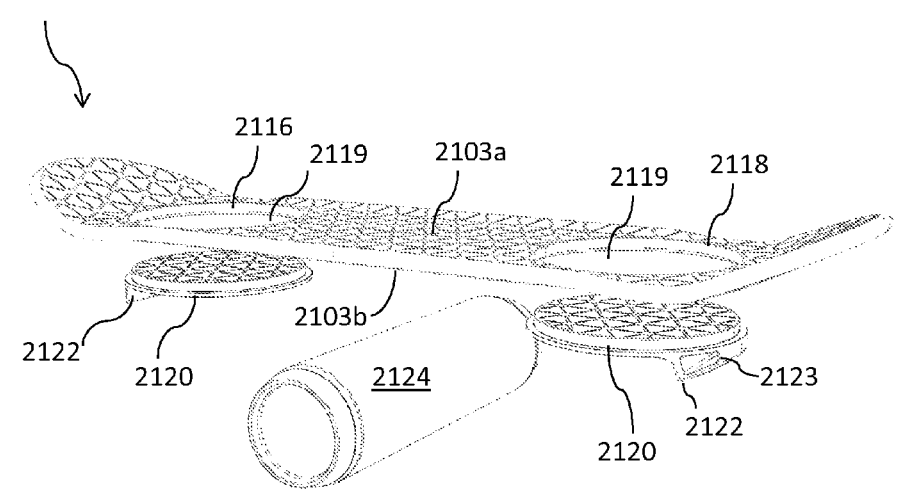
FIG. 22 illustrates an exploded view of the modular activity board of FIG. 21.

FIG. 21 is an illustration of a modular activity board 2100 having one or more features consistent with the disclosed subject matter. FIG. 22 illustrates an exploded view of the modular activity board 2100 of FIG. 21. The modular activity board 2100 can include an activity deck 2101. The activity deck 2101 can be made from one or more of a polymer, polypropylene plastic with glass filling, polypropylene plastic without glass filling, nylon plastic with glass filling, nylon plastic without glass filling, wood composite, carbon fiber, or the like. When glass filling is included glass filling may account for between 20-30% of the material.

The activity deck 2102 can have a top surface 2103*a* and a bottom surface 2103*b*. The activity deck 2102 can be defined by a longitudinal axis 2104 and a lateral axis 2106. In some variations, the longitudinal axis 2104 can be longer than the latitudinal axis 2106. The activity deck 2102 can include a first end portion 2108 and a second end portion 2110. The first end portion 2108 can be opposite the second end portion 2110. The first end portion 2108 and the second end portion 2110 can be angled relative to the activity deck 2101 such that the first end 2112 and the second end 2114 of the first end portion 2108 and the second end portion 2110 rise above the activity deck 2102. The activity deck 2102 can include opposing side rails 2115*a* and 2115*b*.

The center portion of the deck 2102 may be solid and contiguous.

The longitudinal axis 2104 can run through the first end portion 2108 and the second end portion 2110. The latitudinal axis 2106 can run through an approximate center 2117 of the deck through the opposing side rails 2115*a* and 2115*b*.

The modular activity board 2100 may include a first activity accessory receiver 2116 proximate the first end portion 2108 of the activity deck 2102. In some variations, the modular activity board 2100 may include a second activity accessory receiver 2118 proximate the second end portion 2110 of the activity deck 2102. The first activity accessory receiver 2116 and the second activity accessory receiver 2118 can be defined by a single circular aperture 2119. The first activity receiver 2116 and the second activity receiver 2118 can have a first locking mechanism therewith.

The first activity accessory receiver 2116 and the second activity accessory receiver 2118 can be configured to receive one or more of a set of activity accessories. Each activity accessory of the set of activity accessories can comprise an attachment platform 2121. The attachment platform can be sized and configured to mate within the circular aperture 2119 of the first activity receiver 2116 and/or the second activity receiver 2118. The attachment platform 2121 can have a second locking mechanism therewith to cooperate with the first locking mechanism of the first activity receiver 2116 and/or the second activity receiver 2118 to releasably secure the attachment platform 2121 within the single circular aperture 2121. Each activity accessory can comprise an activity mechanism 2123 extending from a top and/or bottom of the attachment platform to enable an activity to be performed by a rider of the modular activity board 2100 when the activity accessory is secured to the deck 2102.

One example of an activity accessory of the set of activity accessories can include a set of balance ends 2120. In this example, the set of balance ends 2120 also form the attachment platform of the activity accessory. The set of balance ends 2120 can be disposed within aperture of the first activity accessory receiver 2116 and the aperture of the second activity accessory receiver 2118. A locking mechanism, described below, can be configured to lock the set of balance ends 2120 in a desired non-rotating orientation such that roll stoppers 2122 of the set of balance ends 2120 are orientated as shown in FIGS. 21 and 22. In this example, the activity mechanism can be a set of roll stoppers 2122. The roll stoppers 2122 can be configured to the deck 2102 balancing on a roller 2124 from falling off the roller 2124.

The modular activity board 2100 in the configuration illustrated in FIGS. 21 and 22 can be configured to facilitate balancing of the deck 2102 on the roller 2124.

Figure 23:
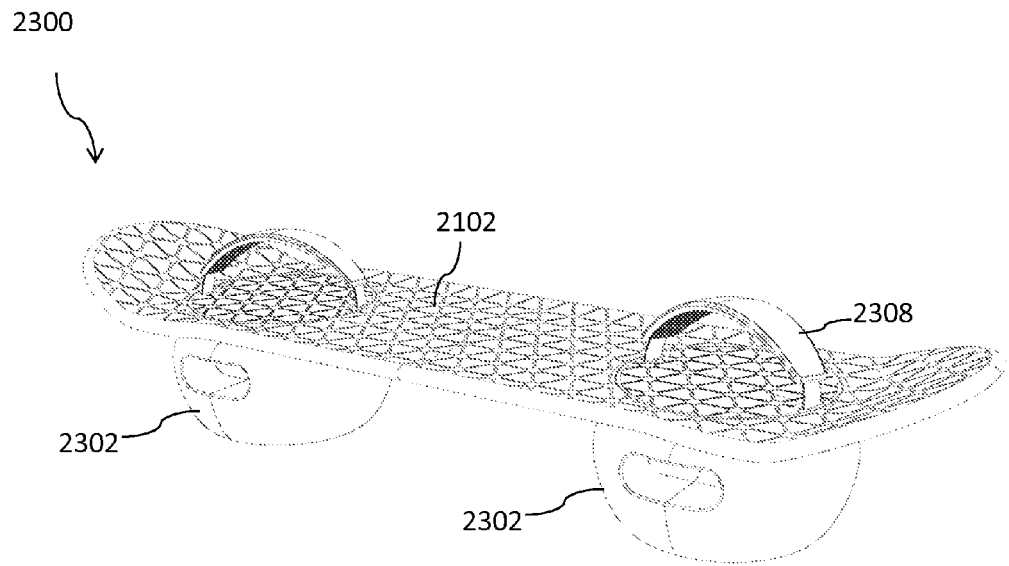
FIG. 23 is an illustration of a modular activity board having one or more features consistent with the disclosed subject matter.
Figure 24:
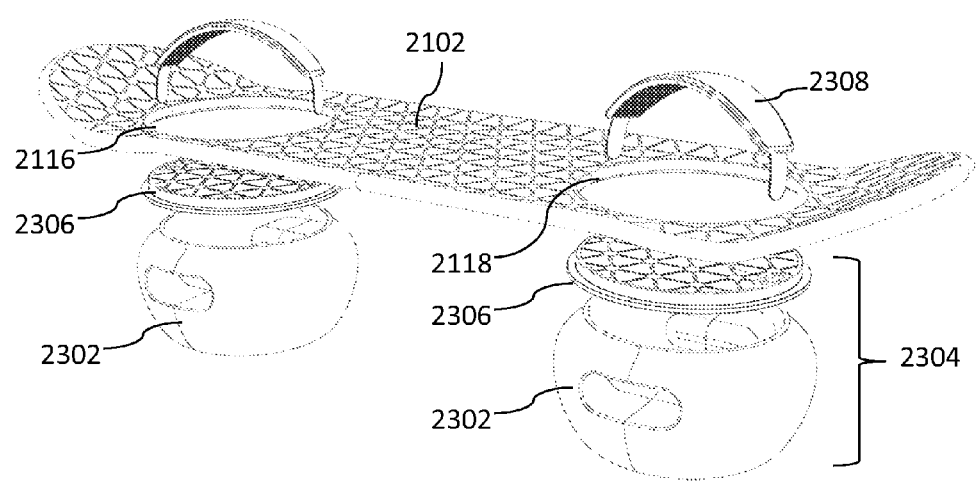
FIG. 24 illustrates an exploded view of the modular activity board of FIG. 23.

FIG. 23 is an illustration of a modular activity board 2300 having one or more features consistent with the disclosed subject matter. FIG. 24 illustrates an exploded view of the modular activity board 2300 of FIG. 23. The illustrated example of an activity accessory of the set of activity accessories is a bounce ball activity accessory 2304. The modular activity board 2300 illustrated in FIGS. 23 and 24 can be configured to facilitate bouncing or balancing on the board by a user of the modular activity board 2300 by using the bounce ball activity accessory 2304. The modular activity board 2300 can be configured to balance and/or bounce on bounce balls 2302. A bounce ball 2302 can be formed from a rubberized polymer, PVC, vinyl, or the like.

The first activity accessory receiver 2116 and the second activity accessory receiver 2118 can be configured to receive a bounce ball activity accessory 2304. The activity mechanism of the bounce ball activity accessory 2304 can include a bounce ball 2302 that extends from an attachment platform. The illustrated example of the attachment platform is a bounce ball attachment platform 2306. The bounce ball attachment platform 2306 can be configured to engage with the first activity accessory receiver 2116 and/or the second activity accessory receiver 2118 of the deck 2102. The bounce ball attachment platform 2306 can be configured to engage with the top of the bounce ball 2302 to securely attach the bounce ball 2302 to the deck 2102. The bounce ball attachment platform 2306 can be configured to receive a foot strap 2308. The foot strap 2308 can be configured to receive a user's foot to facilitate bouncing on the deck 2102 while still keeping the user engaged with the deck 2102.

The modular activity board 2300 can be configured to have two bounce balls 2302, one on either end of the deck 2102.

Figure 25:
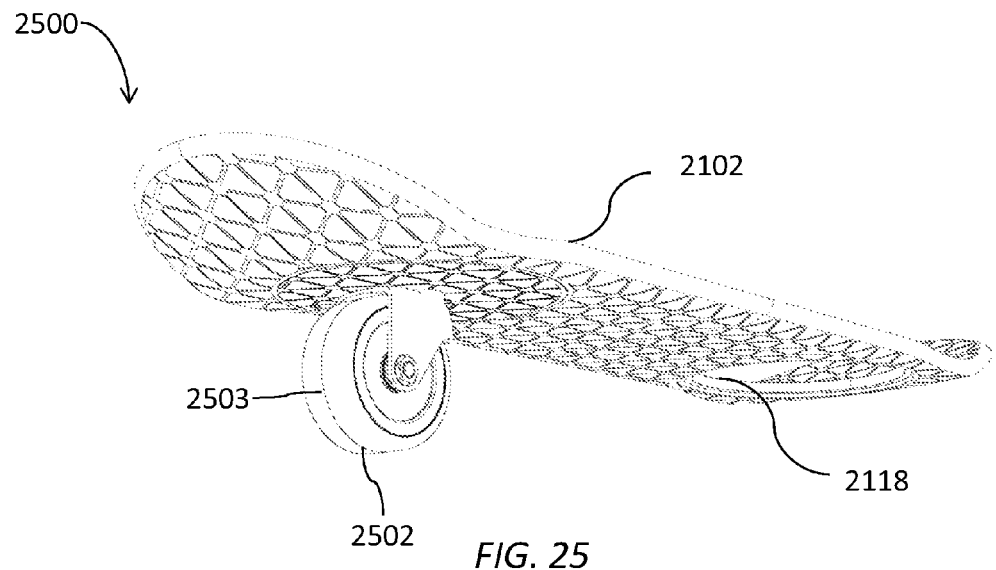
FIG. 25 is an illustration of a modular activity board, with a pivoting wheel accessory, having one or more features consistent with the disclosed subject matter.
Figure 26:
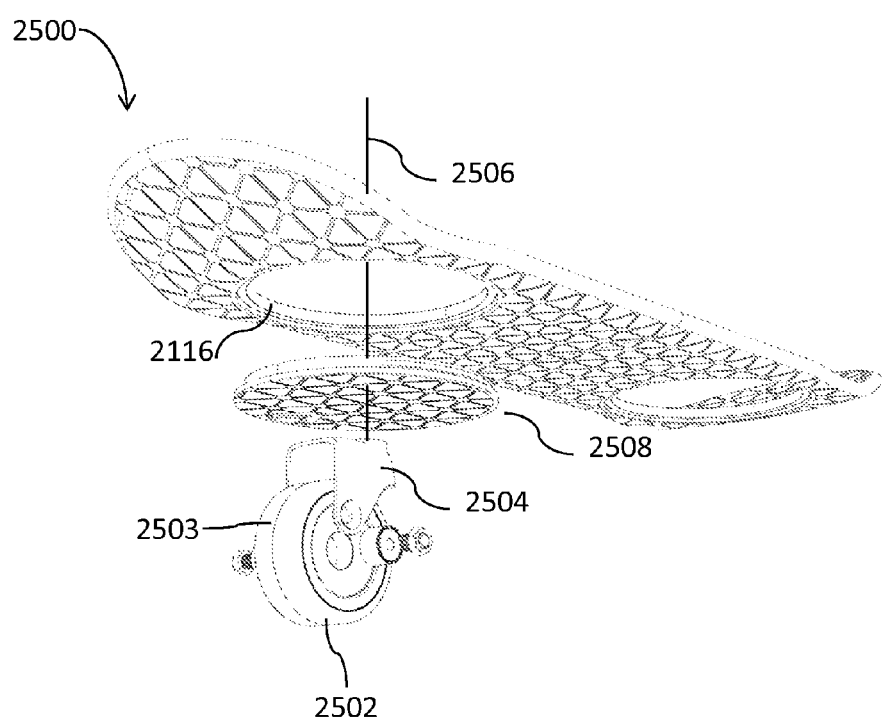
FIG. 26 illustrates an exploded view of the modular activity board of FIG. 25.

FIG. 25 is an illustration of a modular activity board 2500, with the activity accessory being a pivoting wheel accessory 2502, having one or more features consistent with the disclosed subject matter. FIG. 26 illustrates an exploded view of the modular activity board 2500 of FIG. 25. The activity mechanism of the pivoting wheel accessory 2502 can include a pivoting wheel 2503 and a pivot assembly 2504. The pivot assembly 2504 can be configured to facilitate pivoting of the pivoting wheel 2503 about an axis 2506 running perpendicular to the deck 2102.

The pivot assembly 2504 can be attached to an attachment platform 2508. The attachment platform 2508 can be configured to engage with one of the first activity accessory receiver 2116 or the second activity accessory receiver 2118 of the deck 2102. In some variations, the attachment platform 2508 may be configured to be fixed in a non-rotating position with respect to the first activity accessory receiver 2116 or the second activity accessory receiver 2118 of the deck 2102. In other variations, the attachment platform 2508 may be configured to be fixed in a rotating position with respect to the first activity accessory receiver 2116 or the second activity accessory receiver 2118 of the deck 2102.

The pivot assembly 2504 may be fixed to the attachment platform 2508 using fasteners, a connector, or some other attachment mechanism.

Figure 27:
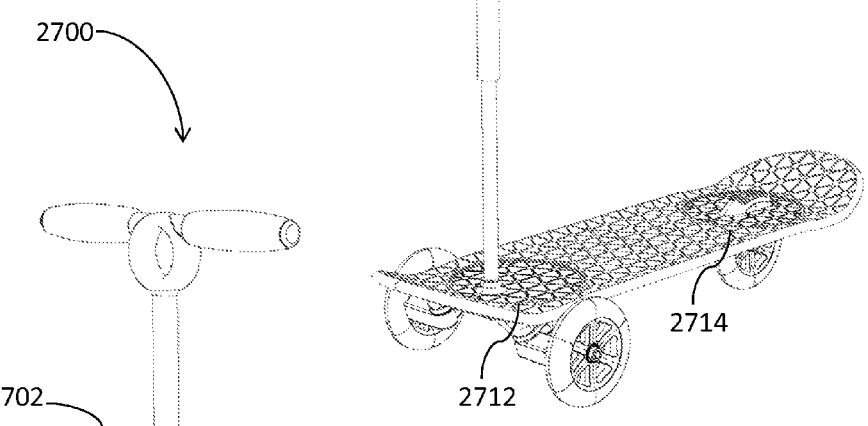
FIG. 27 is an illustration of a modular activity board, with a set of scooter accessories, having one or more features consistent with the disclosed subject matter.
Figure 28:
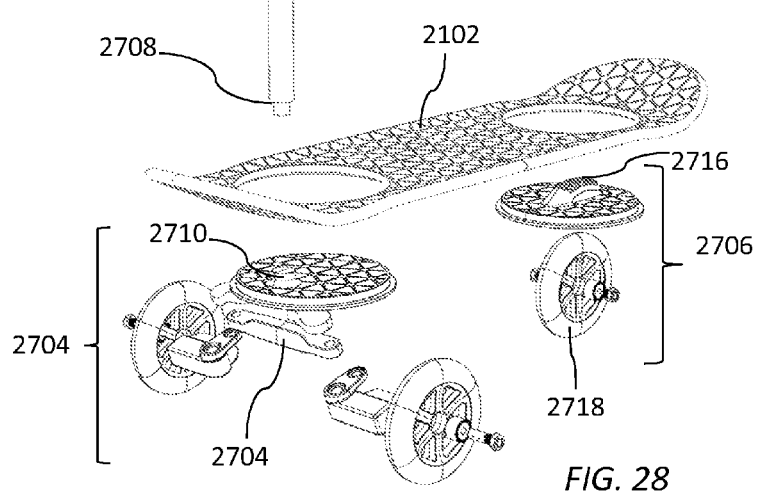
FIG. 28 illustrates an exploded view of the modular activity board of FIG. 27.

FIG. 27 is an illustration of a modular activity board 2700, with the activity accessory, of the set of activity accessories, being a set of scooter accessories, having one or more features consistent with the disclosed subject matter. FIG. 28 illustrates an exploded view of the modular activity board 2700 of FIG. 27. The set of scooter accessories can include a scooter handle 2702, a front scooter wheel system 2704, and a rear scooter wheel assembly 2706. The attachment platform of the set of scooter accessories can include a front scooter attachment platform 2712 and a rear scooter attachment platform 2714.

The scooter handle may include a steering engagement portion 2708. The steering engagement portion 2708 may be configured to engage with the scooter handle engagement portion 2710 of the front scooter wheel system 2704. The front scooter wheel system 2704 may be configured to engage with the front scooter attachment platform 2712. The front scooter attachment platform 2712 may be configured to secure the front scooter wheel system 2704 to the deck 2102. The front scooter attachment platform 2712 may be configured to secure, in a non-rotating configuration, the front scooter wheel system 2704 to the deck 2102. The front scooter attachment platform 2712 may include the scooter handle engagement portion 2710. The front scooter attachment platform 2712 may be configured to facilitate rotation of a steering mechanism 2704 by the handle 2702.

In some variations, the handle 2702 can be removed from its housing. While the handle 2702 is illustrated as being used with the set of scooter accessories, the presently described subject matter contemplates that the handle 2702 can be used with other activity accessories. For example, the handle 2702 can be used with the set of skateboard accessories, illustrated in FIGS. 29 and 30. The handle 2702 can be fixed to the attachment platform 2906 of the modular activity board 2900. The attachment platform 2906 may include a handle engagement portion 2710 for engagement with the engagement portion 2708 of the handle 2702. In some variations, the handle can facilitate steering of the skateboard wheels. In some variations, the handle 2702 can be a fixed handle used for stability.

The rear scooter wheel assembly 2706 may be configured to engage with a rear attachment scooter platform 2714. The rear scooter attachment platform 2714 may be configured to secure the rear scooter wheel assembly 2706 to the deck 2102. In some variations, the rear scooter attachment platform 2714 may be configured to prohibit lateral rotation of the wheel with respect to the deck 2102. In other variations, the rear scooter attachment platform 2714 may be configured to facilitate lateral rotation of the rear wheel 2706 with respect to the deck 2102. The rear scooter wheel assembly 2706 may include a brake 2716. The brake 2716 may be configured to allow the user to step on the brake 2716 causing the brake 2716 to touch the rear wheel 2718.

In some variations, the scooter handle 2702 can be telescoping. In some variations, the rear scooter wheel assembly 2706 can have one or more features of the pivoting wheel accessory 2502. In this configuration, the modular activity board 2700 can facilitate drifting.

The wheels illustrated in the Figures can be formed from one or more of a polymer, polyurethane, or the like. The wheels can have various thicknesses, hardness levels, or the like.

Figure 29:
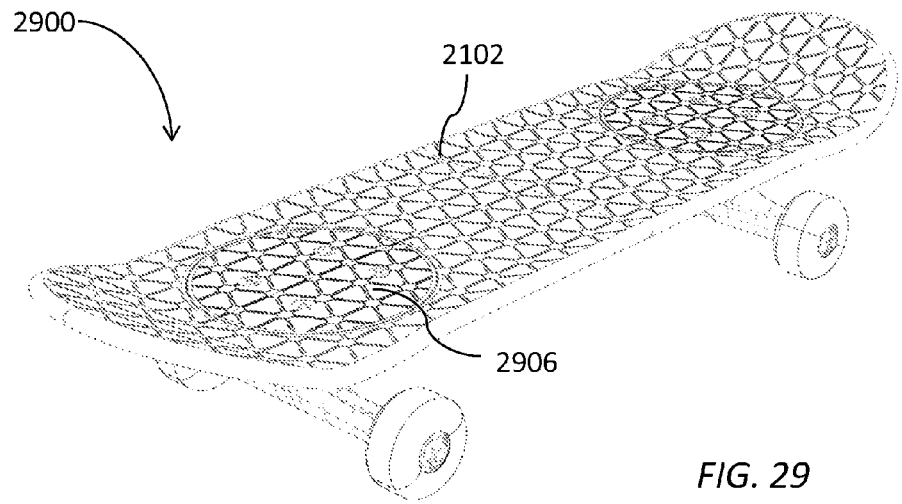
FIG. 29 is an illustration of a modular activity board, with a set of skateboard accessories, having one or more features consistent with the disclosed subject matter.
Figure 30:
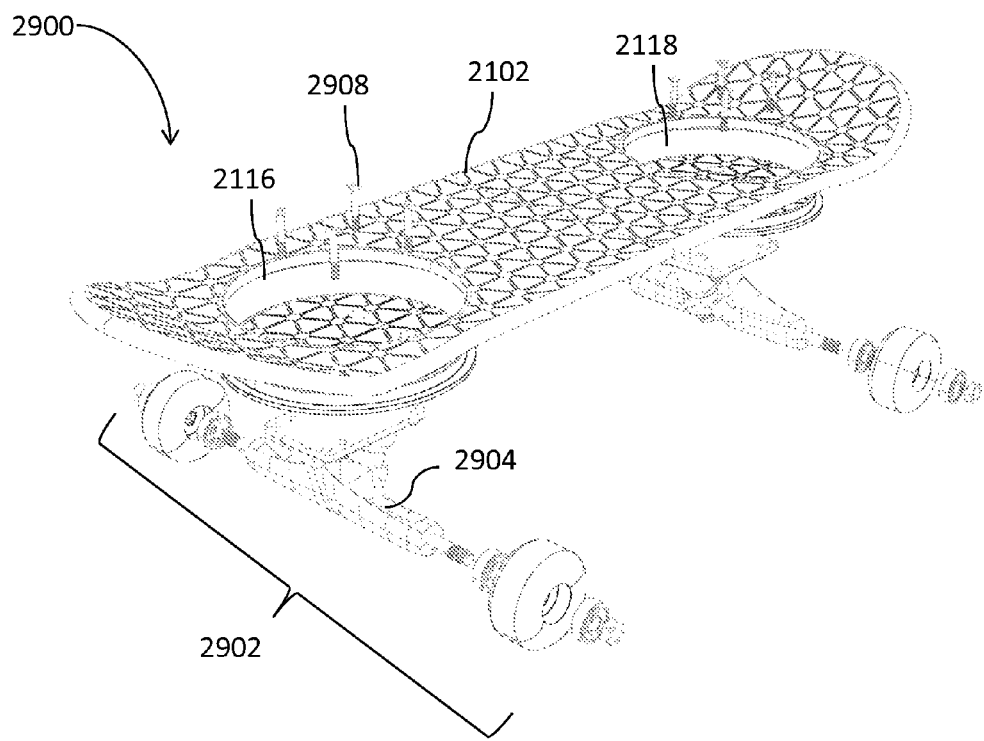
FIG. 30 illustrates an exploded view of the modular activity board of FIG. 29.

FIG. 29 is an illustration of a modular activity board 2900, with the activity accessory, of the set of activity accessories, being a set of skateboard accessories 2902, having one or more features consistent with the disclosed subject matter. FIG. 30 illustrates an exploded view of the modular activity board 2900 of FIG. 29. The set of skateboard accessories 2902 can include a skateboard truck 2904. The attachment platform can include a skateboard attachment platform 2906. The truck 2904 can be fixed to the skateboard attachment platform 2906. The skateboard attachment platform 2906 can be configured to mount the set of skateboard accessories 2902 into the deck 2102 at the first and second activity accessory receivers 2116 and 2118. The skateboard attachment platform 2906 can be configured to prohibit rotation of the skateboard accessory platform 2906 within the first and second activity accessory receivers 2116 and 2118.

In some variations, the skateboard trucks 2904 can be attached to the skateboard attachment platform 2906 using fasteners 2908. In some variations, the skateboard attachment platform 2906 can be the same attachment platform as the wheel attachment platform 2508 illustrated in FIGS. 25 and 26, the attachment platform 2306 illustrated in FIGS. 23 and 24, and/or the attachment platform 2120 illustrated in FIGS. 21 and 22. The attachment platform illustrated in those figures may substantially include a disk with a locking mechanism, complimentary to the locking mechanism in the first accessory receiver and/or the second accessory receiver.

In some variations, resistance bands may be attached to the deck 2102 or any of the activity accessories described herein attached to the deck 2102. The resistance bands can be held by a user of the modular activity board and facilitate keeping the deck 2102 engaged with the user's feet as they use the modular activity board.

Figure 31:
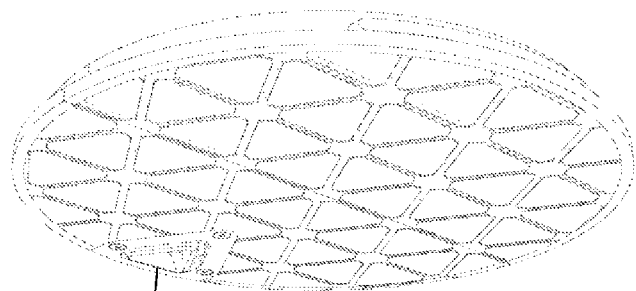
FIG. 31 is an illustration of an activity accessory locking mechanism having one or more features consistent with the disclosed subject matter.
Figure 32:
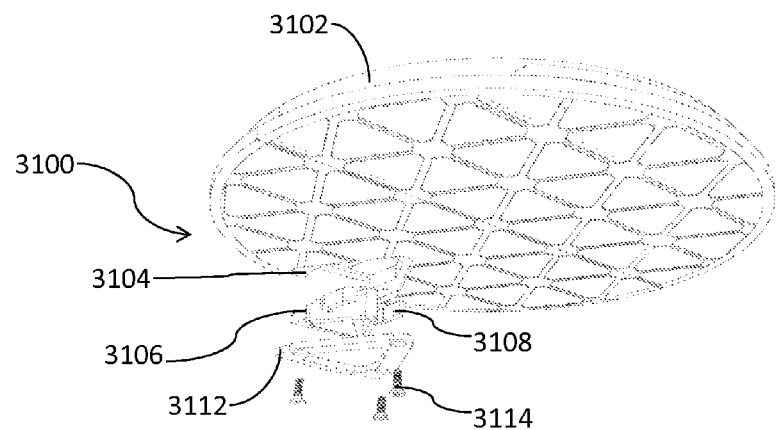
FIG. 32 illustrates an exploded view of the activity accessory locking mechanism illustrated in FIG. 31; and, FIG. 33 illustrates an alternative exploded view of the activity accessory locking mechanism illustrated in FIG. 31.
Figure 33:
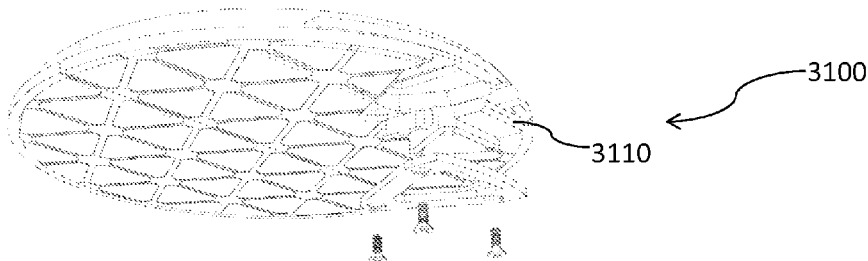

FIG. 31 is an illustration of an activity accessory locking mechanism 3100 having one or more features consistent with the disclosed subject matter. FIG. 32 illustrates an exploded view of the activity accessory locking mechanism 3100 illustrated in FIG. 31. FIG. 33 illustrates an alternative exploded view of the activity accessory locking mechanism 3100 illustrated in FIG. 31. The locking mechanism 3100 can be configured to secure an attachment platform 3102 into the deck 2102 of a modular activity board. The attachment platform 3102 can include a locking mechanism recess 3104 configured to receive the locking mechanism 3100. The locking mechanism 3100 can include coupling mechanism 3106. The coupling mechanism 3106 can include one or more resilient spring portions 3108. The resilient spring portions 3108 can be configured to engage with the recess 3104 in the attachment platform 3102. The spring portions 3108 can be engaged in response to a user moving the coupling mechanism 3106 inward toward the center of the attachment platform 3102.

The coupling mechanism 3106 can include a flange 3110. The flange 3110 can be configured to engage with a complimentary aperture in the first activity accessory receiver 2116 and/or the second activity accessory receiver 2118. The coupling mechanism 3106 can be secured to the attachment platform 3102 by a coupling mechanism cover 3112. The coupling mechanism cover 3112 can be secured by one or more fasteners 3114.

In some variations, the accessory locking mechanism 3100 can have one or more features of the locking mechanism 206 illustrated in FIGS. 2 and 3.

Although a few embodiments have been described in detail above, other modifications are possible. Other embodiments may be within the scope of the following claims.

What is claimed is:

1. A apparatus comprising:
   a deck having a top surface a bottom surface, a first end portion and a second end portion;
   a first activity accessory receiver proximate the first end portion, the first activity accessory receiver defined by a first single aperture;
   a second activity accessory receiver proximate the second end portion, the second activity accessory receiver defined by a second single aperture;
   a first deck locking mechanism disposed in the first single aperture;
   a second deck locking mechanism disposed in the second single aperture;
   a first activity accessory having a size and shape configured to mate within the first single aperture;
   a second activity accessory having a size and shape configured to mate within the second single aperture;

a first activity accessory locking mechanism configured to releasably engage with the first deck locking mechanism; and a second activity accessory locking mechanism configured to releasably engage with the second deck locking mechanism.

2. The apparatus in accordance with claim 1, wherein the first activity accessory comprises a first attachment platform.

3. The apparatus in accordance with claim 2, wherein the first activity accessory comprise at least one of: one or more wheels on an axle mounted to the bottom of the first attachment platform; a roll stopper mounted to the bottom of the first attachment platform; a bounce ball mounted to the bottom of the first attachment platform; or a scooter handle mounted to the top of the first attachment platform and one or more wheels on an axle mounted to the bottom of the first attachment platform.

4. The apparatus in accordance with claim 1, wherein a center portion of the deck is solid and contiguous, the center portion disposed between the first end portion and the second end portion.

5. The apparatus in accordance with claim 1, wherein the first deck locking mechanism is configured to secure the first activity accessory in a non-rotating position within the first single aperture and the second deck locking mechanism is configured to secure the second activity accessory in a non-rotating position within the second single aperture.

6. The apparatus in accordance with claim 1, further comprising:

a thread around at least a portion of the perimeter of each of the first and second single apertures.

7. The apparatus in accordance with claim 6, wherein the first and second activity accessories each comprise an attachment platform, and wherein the apparatus further comprises:

a thread around at least a portion of the perimeter of the first attachment platform configured to engage with the thread of the first single aperture; and a thread around at a portion of the perimeter of the second attachment platform configured to engage with the thread of the second attachment platform.

8. The apparatus in accordance with claim 1, wherein the first activity accessory locking mechanism includes a retractable pin to engage with the first deck locking mechanism.

9. The apparatus in accordance with claim 2, wherein the first activity accessory locking mechanism comprises:

an actuator configured to facilitate retraction of the retractable pin; and, at least one biasing member configured to provide a bias to the retractable pin to extend the retractable pin from a retracted position.

10. The apparatus in accordance with claim 1, wherein the first deck locking mechanism comprises a retractable pin to engage with the first activity accessory locking mechanism.

11. The apparatus in accordance with claim 1, wherein the first activity accessory locking mechanism is configured to engage with the first deck locking mechanism in response to the first activity accessory being placed into the first single aperture.

12. The apparatus in accordance with claim 1, wherein the deck is formed from one or more of polypropylene plastic with glass filling, polypropylene plastic without glass filling, nylon plastic with glass filling, nylon plastic without glass filling, wood composite, and carbon fiber.

13. The apparatus in accordance with claim 1, further comprising elasticated bands configured to be attached to or more of the deck or the first activity accessory.

14. The apparatus in accordance with claim 13, wherein the elasticated bands are configured to allow a user to maintain contact with the deck.

* * * * *